US010809066B2

(12) United States Patent
Colburn et al.

(10) Patent No.: US 10,809,066 B2
(45) Date of Patent: Oct. 20, 2020

(54) AUTOMATED MAPPING INFORMATION GENERATION FROM INTER-CONNECTED IMAGES

(71) Applicant: Zillow Group, Inc., Seattle, WA (US)

(72) Inventors: Alex Colburn, Seattle, WA (US); Qi Shan, Mercer Island, WA (US); Ramin Mehran, Kirkland, WA (US); Li Guan, Bellevue, WA (US)

(73) Assignee: Zillow Group, Inc., Seattle, WA (US)

( * ) Notice: Subject to any disclaimer, the term of this patent is extended or adjusted under 35 U.S.C. 154(b) by 0 days.

(21) Appl. No.: 16/190,162

(22) Filed: Nov. 14, 2018

(65) Prior Publication Data

US 2020/0116493 A1   Apr. 16, 2020

Related U.S. Application Data

(60) Provisional application No. 62/744,472, filed on Oct. 11, 2018.

(51) Int. Cl.
*G01C 21/20* (2006.01)
*H04N 5/232* (2006.01)
(Continued)

(52) U.S. Cl.
CPC ......... *G01C 21/206* (2013.01); *G05D 1/0274* (2013.01); *G06K 9/00671* (2013.01);
(Continued)

(58) Field of Classification Search
CPC ......... G01C 21/206; G06T 17/05; G06T 7/60; G06T 7/73; G06T 7/55; G06T 7/97;
(Continued)

(56) References Cited

U.S. PATENT DOCUMENTS

| 5,140,352 A | 8/1992 | Moore et al. |
| 6,031,540 A | 2/2000 | Golin et al. |

(Continued)

FOREIGN PATENT DOCUMENTS

| EP | 2413097 A2 | 2/2012 |
| EP | 2505961 A2 | 10/2012 |

(Continued)

OTHER PUBLICATIONS

CubiCasa | From video to floor plan in under 5 minutes, retrieved on Mar. 26, 2019, from https://www.cubi.casa/, 6 pages.

(Continued)

*Primary Examiner* — Tracy Y. Li
(74) *Attorney, Agent, or Firm* — VLP Law Group LLP; James A. D. White

(57) ABSTRACT

Techniques are described for using computing devices to perform automated operations to generate mapping information using inter-connected images of a defined area, and for using the generated mapping information in further automated manners. In at least some situations, the defined area includes an interior of a multi-room building, and the generated information includes a floor map of the building, such as from an automated analysis of multiple panorama images or other images acquired at various viewing locations within the building—in at least some such situations, the generating is further performed without having detailed information about distances from the images' viewing locations to walls or other objects in the surrounding building. The generated floor map and other mapping-related information may be used in various manners, including for controlling navigation of devices (e.g., autonomous vehicles), for display on one or more client devices in corresponding graphical user interfaces, etc.

25 Claims, 13 Drawing Sheets

(51) Int. Cl.
*G06T 7/00* (2017.01)
*G06T 7/73* (2017.01)
*G06T 7/55* (2017.01)
*G06T 17/05* (2011.01)
*G06K 9/00* (2006.01)
*G05D 1/02* (2020.01)
*G06T 7/60* (2017.01)
*G05D 1/00* (2006.01)
*G06F 3/0482* (2013.01)

(52) U.S. Cl.
CPC ............... *G06T 7/55* (2017.01); *G06T 7/60* (2013.01); *G06T 7/73* (2017.01); *G06T 7/97* (2017.01); *G06T 17/05* (2013.01); *H04N 5/23238* (2013.01); *G05D 1/0088* (2013.01); *G06F 3/0482* (2013.01); *G06T 2200/24* (2013.01); *G06T 2207/30244* (2013.01)

(58) Field of Classification Search
CPC ...... G06T 2200/24; G06T 2207/30244; H04N 5/23238; G06K 9/00671; G05D 1/0274; G05D 1/0088; G06F 3/0482
See application file for complete search history.

(56) References Cited

U.S. PATENT DOCUMENTS

| | | | |
|---|---|---|---|
| 6,141,034 A | 10/2000 | McCutchen | |
| 6,317,166 B1 | 11/2001 | McCutchen | |
| 6,320,584 B1 | 11/2001 | Golin et al. | |
| 6,323,858 B1 | 11/2001 | Gilbert et al. | |
| 6,337,683 B1 | 1/2002 | Gilbert et al. | |
| 6,654,019 B2 | 11/2003 | Gilbert et al. | |
| 6,683,608 B2 | 1/2004 | Golin et al. | |
| 6,690,374 B2 | 2/2004 | Park et al. | |
| 6,731,305 B1 | 5/2004 | Park et al. | |
| 6,738,073 B2 | 5/2004 | Park et al. | |
| 7,050,085 B1 | 5/2006 | Park et al. | |
| 7,129,971 B2 | 10/2006 | McCutchen | |
| 7,196,722 B2 | 3/2007 | White et al. | |
| 7,525,567 B2 | 4/2009 | McCutchen | |
| 7,620,909 B2 | 11/2009 | Park et al. | |
| 7,627,235 B2 | 12/2009 | McCutchen et al. | |
| 7,782,319 B2 | 8/2010 | Ghosh et al. | |
| 7,791,638 B2 | 9/2010 | McCutchen | |
| 7,909,241 B2 | 3/2011 | Stone et al. | |
| 7,973,838 B2 | 7/2011 | McCutchen | |
| 8,072,455 B2 | 12/2011 | Temesvari et al. | |
| 8,094,182 B2 | 1/2012 | Park et al. | |
| RE43,786 E | 11/2012 | Cooper et al. | |
| 8,463,020 B1 | 6/2013 | Schuckmann et al. | |
| 8,517,256 B2 | 8/2013 | Stone et al. | |
| 8,520,060 B2 | 8/2013 | Zomet et al. | |
| 8,523,066 B2 | 9/2013 | Stone et al. | |
| 8,523,067 B2 | 9/2013 | Stone et al. | |
| 8,528,816 B2 | 9/2013 | Stone et al. | |
| 8,540,153 B2 | 9/2013 | Stone et al. | |
| 8,594,428 B2 | 11/2013 | Aharoni et al. | |
| 8,654,180 B2 | 2/2014 | Zomet et al. | |
| 8,699,005 B2 | 4/2014 | Likholyot | |
| 8,705,892 B2 | 4/2014 | Aguilera et al. | |
| RE44,924 E | 6/2014 | Cooper et al. | |
| 8,854,684 B2 | 10/2014 | Zomet | |
| 8,861,840 B2 | 10/2014 | Bell et al. | |
| 8,861,841 B2 | 10/2014 | Bell et al. | |
| 8,879,828 B2 | 11/2014 | Bell et al. | |
| 8,953,871 B2 | 2/2015 | Zomet | |
| 8,989,440 B2 | 3/2015 | Klusza et al. | |
| 8,996,336 B2 | 3/2015 | Malka et al. | |
| 9,021,947 B2 | 5/2015 | Landa | |
| 9,035,968 B2 | 5/2015 | Zomet | |
| 9,041,796 B2 | 5/2015 | Malka et al. | |
| 9,071,714 B2 | 6/2015 | Zomet | |
| 9,129,438 B2 | 9/2015 | Aarts et al. | |
| 9,151,608 B2 | 10/2015 | Malka et al. | |
| 9,165,410 B1 | 10/2015 | Bell et al. | |
| 9,171,405 B1 | 10/2015 | Bell et al. | |
| 9,324,190 B2 | 4/2016 | Bell et al. | |
| 9,361,717 B2 | 6/2016 | Zomet | |
| 9,396,586 B2 | 7/2016 | Bell et al. | |
| 9,438,759 B2 | 9/2016 | Zomet | |
| 9,438,775 B2 | 9/2016 | Powers et al. | |
| 9,489,775 B1 | 11/2016 | Bell et al. | |
| 9,495,783 B1 | 11/2016 | Samarasekera et al. | |
| 9,576,401 B2 | 2/2017 | Zomet | |
| 9,619,933 B2 | 4/2017 | Spinella-Marno et al. | |
| 9,635,252 B2 | 4/2017 | Accardo et al. | |
| 9,641,702 B2 | 5/2017 | Bin-Nun et al. | |
| 9,760,994 B1 | 9/2017 | Bell et al. | |
| 9,786,097 B2 | 10/2017 | Bell et al. | |
| 9,787,904 B2 | 10/2017 | Birkler et al. | |
| 9,836,885 B1 | 12/2017 | Eraker et al. | |
| 9,852,351 B2 | 12/2017 | Aguilera Perez et al. | |
| 9,953,111 B2 | 4/2018 | Bell et al. | |
| 9,953,430 B1 | 4/2018 | Zakhor | |
| 9,990,760 B2 | 6/2018 | Aguilera Perez et al. | |
| 9,990,767 B1 | 6/2018 | Sheffield et al. | |
| 10,026,224 B2 | 7/2018 | Bell et al. | |
| 10,030,979 B2 | 7/2018 | Bjorke et al. | |
| 10,055,876 B2 | 8/2018 | Ford et al. | |
| 10,068,344 B2 | 9/2018 | Jovanovic et al. | |
| 10,083,522 B2 | 9/2018 | Jovanovic et al. | |
| 10,102,639 B2 | 10/2018 | Bell et al. | |
| 10,102,673 B2 | 10/2018 | Eraker et al. | |
| 10,120,397 B1 | 11/2018 | Zakhor et al. | |
| 10,122,997 B1 | 11/2018 | Sheffield et al. | |
| 10,127,718 B2 | 11/2018 | Zakhor et al. | |
| 10,127,722 B2 | 11/2018 | Shakib et al. | |
| 10,139,985 B2 | 11/2018 | Mildrew et al. | |
| 10,163,261 B2 | 12/2018 | Bell et al. | |
| 10,163,271 B1 | 12/2018 | Powers et al. | |
| 10,181,215 B2 | 1/2019 | Sedeffow | |
| 10,192,115 B1 | 1/2019 | Sheffield et al. | |
| 10,204,185 B2 | 2/2019 | Mrowca et al. | |
| 10,210,285 B2 | 2/2019 | Wong et al. | |
| 10,235,797 B1 | 3/2019 | Sheffield et al. | |
| 10,242,400 B1 | 3/2019 | Eraker et al. | |
| 10,339,716 B1 | 7/2019 | Powers et al. | |
| 10,366,531 B2 | 7/2019 | Sheffield | |
| 10,395,435 B2 | 8/2019 | Powers et al. | |
| 2006/0256109 A1 | 11/2006 | Acker et al. | |
| 2010/0232709 A1 | 9/2010 | Zhang et al. | |
| 2012/0075414 A1 | 3/2012 | Park et al. | |
| 2012/0293613 A1 | 11/2012 | Powers et al. | |
| 2013/0226451 A1* | 8/2013 | O'Neill | G01C 21/206 701/450 |
| 2013/0325244 A1* | 12/2013 | Wang | G05D 1/028 701/26 |
| 2013/0342533 A1 | 12/2013 | Bell et al. | |
| 2014/0043436 A1 | 2/2014 | Bell et al. | |
| 2014/0044343 A1 | 2/2014 | Bell et al. | |
| 2014/0044344 A1 | 2/2014 | Bell et al. | |
| 2014/0125658 A1 | 5/2014 | Bell et al. | |
| 2014/0125767 A1 | 5/2014 | Bell et al. | |
| 2014/0125768 A1 | 5/2014 | Bell et al. | |
| 2014/0125769 A1 | 5/2014 | Bell et al. | |
| 2014/0125770 A1 | 5/2014 | Bell et al. | |
| 2014/0236482 A1 | 8/2014 | Dorum et al. | |
| 2014/0267631 A1 | 9/2014 | Powers et al. | |
| 2014/0307100 A1 | 10/2014 | Myllykoski et al. | |
| 2015/0116691 A1 | 4/2015 | Likholyot | |
| 2015/0189165 A1 | 7/2015 | Milosevski et al. | |
| 2015/0262421 A1 | 9/2015 | Bell et al. | |
| 2015/0269785 A1 | 9/2015 | Bell et al. | |
| 2015/0302636 A1 | 10/2015 | Arnoldus et al. | |
| 2015/0310596 A1 | 10/2015 | Sheridan et al. | |
| 2015/0332464 A1 | 11/2015 | O'Keefe et al. | |
| 2016/0055268 A1 | 2/2016 | Bell et al. | |
| 2016/0134860 A1 | 5/2016 | Jovanovic et al. | |
| 2016/0140676 A1 | 5/2016 | Fritze et al. | |
| 2016/0217225 A1 | 7/2016 | Bell et al. | |
| 2016/0260250 A1 | 9/2016 | Jovanovic et al. | |
| 2016/0286119 A1 | 9/2016 | Rondinelli | |

(56) References Cited

U.S. PATENT DOCUMENTS

| | | |
|---|---|---|
| 2016/0300385 A1 | 10/2016 | Bell et al. |
| 2017/0034430 A1 | 2/2017 | Fu et al. |
| 2017/0067739 A1 | 3/2017 | Siercks et al. |
| 2017/0194768 A1 | 7/2017 | Powers et al. |
| 2017/0195654 A1 | 7/2017 | Powers et al. |
| 2017/0263050 A1 | 9/2017 | Ha et al. |
| 2017/0324941 A1 | 11/2017 | Birkler |
| 2017/0330273 A1 | 11/2017 | Holt et al. |
| 2017/0337737 A1 | 11/2017 | Edwards et al. |
| 2018/0025536 A1 | 1/2018 | Bell et al. |
| 2018/0075168 A1* | 3/2018 | Tiwari ............ G06F 17/5004 |
| 2018/0139431 A1 | 5/2018 | Simek et al. |
| 2018/0143023 A1 | 5/2018 | Bjorke et al. |
| 2018/0143756 A1 | 5/2018 | Mildrew et al. |
| 2018/0144487 A1 | 5/2018 | Bell et al. |
| 2018/0144535 A1 | 5/2018 | Ford et al. |
| 2018/0144547 A1 | 5/2018 | Shakib et al. |
| 2018/0144555 A1 | 5/2018 | Ford et al. |
| 2018/0146121 A1 | 5/2018 | Hensler et al. |
| 2018/0146193 A1 | 5/2018 | Safreed et al. |
| 2018/0146212 A1 | 5/2018 | Hensler et al. |
| 2018/0165871 A1 | 6/2018 | Mrowca |
| 2018/0203955 A1 | 7/2018 | Bell et al. |
| 2018/0241985 A1 | 8/2018 | O'Keefe et al. |
| 2018/0293793 A1 | 10/2018 | Bell et al. |
| 2018/0300936 A1 | 10/2018 | Ford et al. |
| 2018/0306588 A1 | 10/2018 | Bjorke et al. |
| 2018/0348854 A1 | 12/2018 | Powers et al. |
| 2018/0365496 A1 | 12/2018 | Hoyden et al. |
| 2019/0012833 A1 | 1/2019 | Eraker et al. |
| 2019/0026956 A1 | 1/2019 | Gausebeck et al. |
| 2019/0026957 A1 | 1/2019 | Gausebeck |
| 2019/0026958 A1 | 1/2019 | Gausebeck et al. |
| 2019/0035165 A1 | 1/2019 | Gausebeck |
| 2019/0041972 A1 | 2/2019 | Bae |
| 2019/0050137 A1 | 2/2019 | Mildrew et al. |
| 2019/0051050 A1 | 2/2019 | Bell et al. |
| 2019/0051054 A1 | 2/2019 | Jovanovic et al. |
| 2019/0087067 A1 | 3/2019 | Hoyden et al. |
| 2019/0122422 A1 | 4/2019 | Sheffield et al. |
| 2019/0164335 A1 | 5/2019 | Sheffield et al. |
| 2019/0180104 A1 | 6/2019 | Sheffield et al. |
| 2019/0251645 A1 | 8/2019 | Winans |
| 2019/0287164 A1 | 9/2019 | Eraker et al. |

FOREIGN PATENT DOCUMENTS

| | | |
|---|---|---|
| EP | 2506170 A2 | 10/2012 |
| KR | 101770648 B1 | 8/2017 |
| KR | 101930796 B1 | 12/2018 |
| WO | 2005091894 A2 | 10/2005 |
| WO | 2016/154306 A1 | 9/2016 |
| WO | 2018204279 A1 | 11/2018 |
| WO | 2019083832 A1 | 5/2019 |
| WO | 2019104049 A1 | 5/2019 |
| WO | 2019118599 A2 | 6/2019 |

OTHER PUBLICATIONS

CubiCasa FAQ & Manual, retrieved on Mar. 26, 2019, from https://www.cubi.casa/faq/, 5 pages.

Cupix Home, retrieved on Mar. 26, 2019, from https://www.cupix.com/, 1 page.

Cupix—FAQ, retrieved on Mar. 26, 2019, from https://www.cupix.com/faq.html, 3 pages.

Guide: 3D Virtual Tours, retrieved on Mar. 26, 2019, from https://goiguide.com/, 6 pages.

immoviewer.com | Automated Video Creation & Simple Affordable 3D 360 Tours, retrieved on Mar. 26, 2019, from https://www.immoviewer.com/, 5 pages.

MagicPlan | #1 Floor Plan App, Construction & Surveying Samples, retrieved on Mar. 26, 2019, from https://www.magicplan.app/, 9 pages.

EyeSpy360 Virtual Tours | Virtual Tour with any 360 camera, retrieved on Mar. 27, 2019, from https://www.eyespy360.com/en-us/, 15 pages.

Indoor Reality, retrieved on Mar. 27, 2019, from https://www.indoorreality.com/, 9 pages.

InsideMaps, retrieved on Mar. 27, 2019, from https://www.insidemaps.com/, 7 pages.

Staging | Augmented & Virtual Reality Platform for Business, retrieved on Mar. 27, 2019, from https://www.istaging.com/en/, 7 pages.

Metareal, retrieved on Mar. 27, 2019, from https://www.metareal.com/, 4 pages.

PLNAR—The AR 3D Measuring / Modeling Platform, retrieved on Mar. 27, 2019, from https://www.plnar.co, 6 pages.

YouVR Global, retrieved on Mar. 27, 2019, from https://global.youvr.io/, 9 pages.

GeoCV, retrieved on Mar. 28, 2019, from https://geocv.com/, 4 pages.

Biersdorfer, J.D., "Flow to Make a 3-D Model of Your Home Renovation Vision," in The New York Times, Feb. 13, 2019, retrieved Mar. 28, 2019, 6 pages.

Chen et al. "Rise of the indoor crowd: Reconstruction of building interior view via mobile crowdsourcing." In: Proceedings of the 13th ACM Conference on Embedded Networked Sensor Systems. Nov. 4, 2015, 13 pages.

Immersive 3D for the Real World, retrieved from https://matterport.com/, on Mar. 27, 2017, 5 pages.

Learn About Our Complete 3D System, retrieved from https://matterport.com/how-it-works/, on Mar. 27, 2017, 6 pages.

Surefield FAQ, retrieved from https://surefield.com/faq, on Mar. 27, 2017, 1 page.

Why Surefield, retrieved from https://surefield.com/why-surefield, on Mar. 27, 2017, 7 pages.

Schneider, V., "Create immersive photo experiences with Google Photo Sphere," retrieved from http://geojournalism.org/2015/02/create-immersive-photo-experiences-with-google-photo-sphere/, on Mar. 27, 2017, 7 pages.

Tango (platform), Wikipedia, retrieved from https://en.wikipedia.org/wiki/Tango_(platform), on Jun. 12, 2018, 5 pages.

Zou et al. "LayoutNet: Reconstructing the 3D Room Layout from a Single RGB Image" in arXiv:1803.08999, submitted Mar. 23, 2018, 9 pages.

Lee et al. "RoomNet: End-to-End Room Layout Estimation" in arXiv:1703.00241v2, submitted Aug. 7, 2017, 10 pages.

Tme-of-flight camera, Wikipedia, retrieved from https://en.wikipedia.org/wiki/Time-of-flight_camera, on Aug. 30, 2018, 8 pages.

Magicplan—Android Apps on Go . . . , retrieved from https://play.google.com/store/apps/details?id=com.sensopia.magicplan, on Feb. 21, 2018, 5 pages.

* cited by examiner

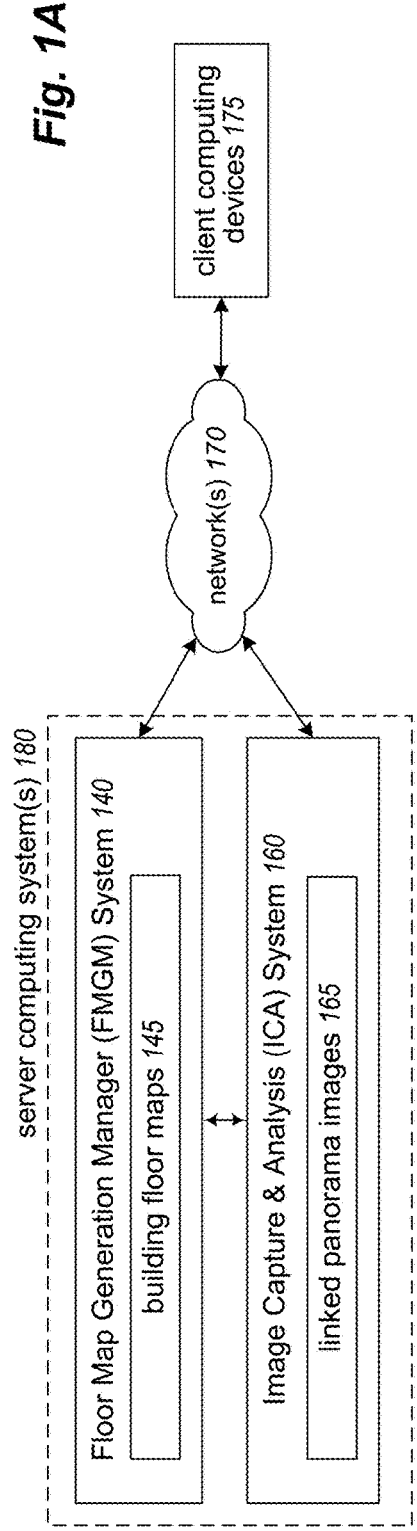
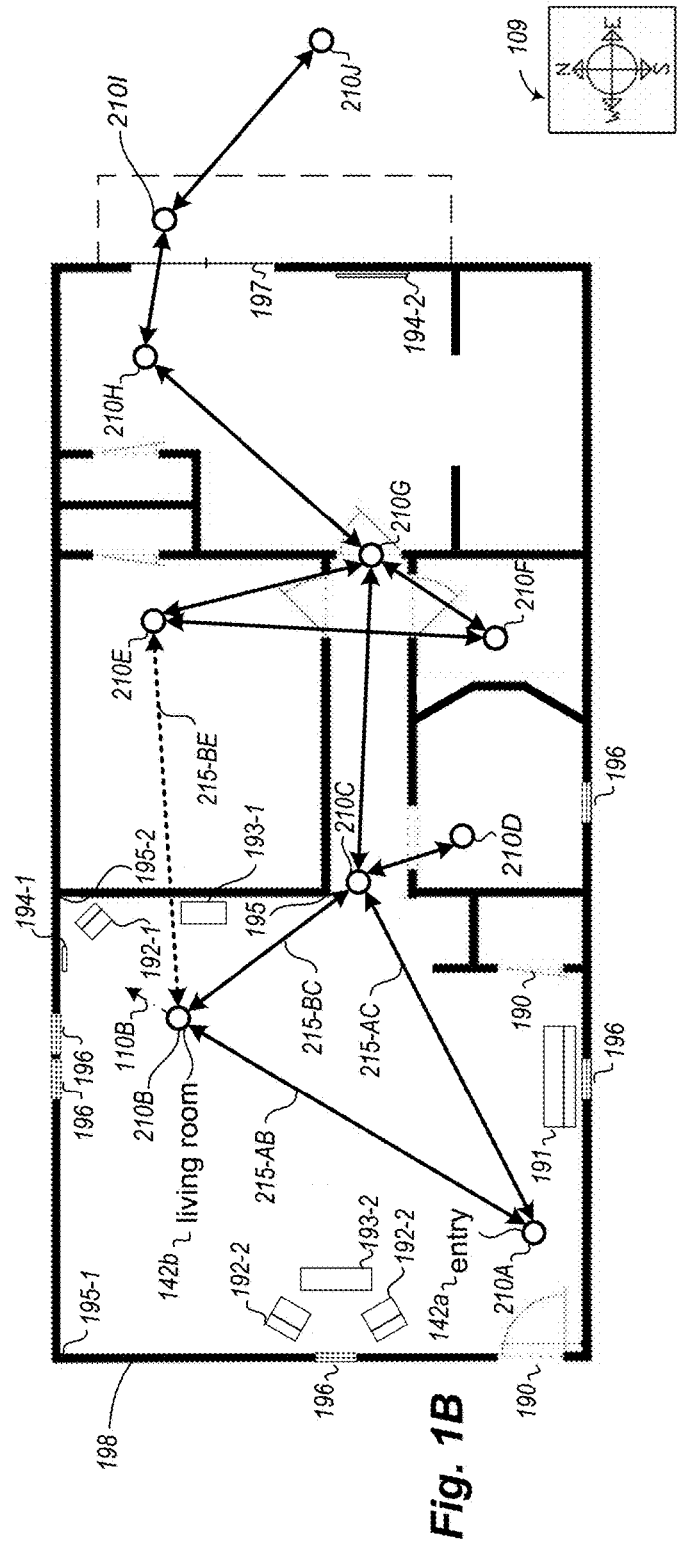

AUTOMATED MAPPING INFORMATION GENERATION FROM INTER-CONNECTED IMAGES

CROSS REFERENCE TO RELATED APPLICATIONS

This application claims the benefit of U.S. Provisional Patent Application No. 62/744,472, filed Oct. 11, 2018 and entitled "Automated Mapping Information Generation From Inter-Connected Images," which is hereby incorporated by reference in its entirety.

TECHNICAL FIELD

The following disclosure relates generally to techniques for automatically generating mapping information for a defined area using inter-connected images of the area and for subsequently using the generated mapping information in one or more manners, such as to automatically generate a floor map of a building using inter-connected panorama images from the building's interior.

BACKGROUND

In various fields and circumstances, such as architectural analysis, property inspection, real estate acquisition and development, general contracting, improvement cost estimation and other circumstances, it may be desirable to view the interior of a house, office, or other building without having to physically travel to and enter the building. However, it can be difficult or impossible to effectively display visual information captured within building interiors to users at remote locations, such as to enable a user to fully understand the layout and other details of the interior, including to control the display in a user-selected manner.

BRIEF DESCRIPTION OF THE DRAWINGS

FIGS. 1A-1H are diagrams depicting an exemplary building interior environment and computing system(s) for use in embodiments of the present disclosure, including to generate and present information representing the building interior.

DETAILED DESCRIPTION

Figure 1C:
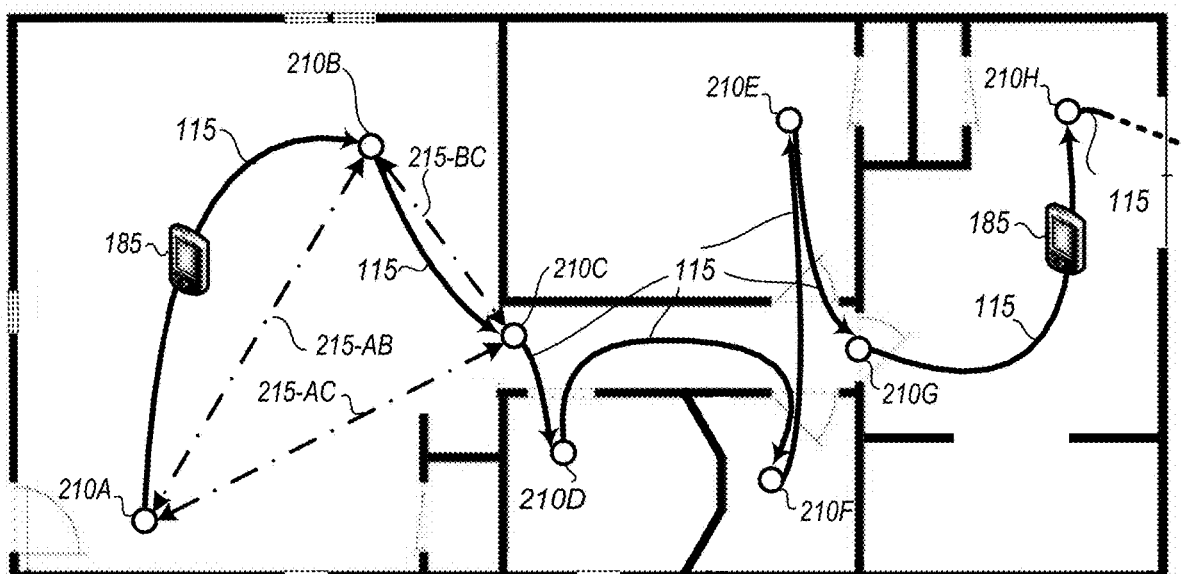

The present disclosure describes techniques for using computing devices to perform automated operations related to generating mapping information for a defined area using inter-connected images of the area, and for subsequently using the generated mapping information in one or more further automated manners. In at least some embodiments, the defined area includes an interior of a multi-room building (e.g., a house, office, etc.), and the generated information includes a floor map of the building, such as from an automated analysis of multiple panorama images or other images acquired at various viewing locations within the building—in at least some such embodiments, the generating is further performed without having or using detailed information about distances from the images' viewing locations to walls or other objects in the surrounding building. The generated floor map and/or other generated mapping-related information may be further used in various manners in various embodiments, including for controlling navigation of mobile devices (e.g., autonomous vehicles), for display on one or more client devices in corresponding GUIs (graphical user interfaces), etc. Additional details are included below regarding the automated generation and use of mapping information, and some or all of the techniques described herein may, in at least some embodiments, be performed via automated operations of a Floor Map Generation Manager ("FMGM") system, as discussed further below.

In at least some embodiments and situations, some or all of the images acquired for a building may be panorama images that are each acquired at one of multiple viewing locations in or around the building, such as to optionally generate a panorama image at a viewing location from a video at that viewing location (e.g., a 360° video taken from a smartphone or other mobile device held by a user turning at that viewing location), from multiple images acquired in multiple directions from the viewing location (e.g., from a smartphone or other mobile device held by a user turning at that viewing location), etc. It will be appreciated that such a panorama image may in some situations be represented in a spherical coordinate system and cover up to 360° around horizontal and/or vertical axes, such that a user viewing a starting panorama image may move the viewing direction within the starting panorama image to different orientations to cause different images (or "views") to be rendered within the starting panorama image (including, if the panorama image is represented in a spherical coordinate system, to convert the image being rendered into a planar coordinate system). Furthermore, acquisition metadata regarding the capture of such panorama images may be obtained and used in various manners, such as data acquired from IMU (inertial measurement unit) sensors or other sensors of a mobile device as it is carried by a user or otherwise moved between viewing locations. Additional details are included below related to the acquisition and usage of panorama images or other images for a building.

After multiple inter-connected panorama images or other images are acquired for a building interior (and optionally an exterior of the building), with the viewing location of each image having a directional link to at least one other image's viewing location, the generation of the floor map for the building may include automatically determining relative global positions of all the images' viewing locations to each other in a common coordinate system or other common frame of reference. Once such relative positions are determined, the directions and relative distances between each pair of viewing locations are available—with respect to such relative distances, the determination may include identifying that first and second viewing locations are twice as far from each other as third and fourth viewing locations, but without knowing the actual distances between those viewing locations. The determination of the relative positions of the images' viewing locations may be performed in various manners in various embodiments, including to use information from the images themselves (e.g., by successively identifying common features in two different images to determine their relative positions to each other), from the received information about the inter-connected images (e.g., from previously generated links and/or directions between at least some pairs of images), and/or from metadata about acquisition of the images (e.g., by analyzing information about a path traveled by a device or user between viewing locations in order to determine their relative positions). In other embodiments, the images may not be inter-connected, in which additional operations may optionally be performed to connect pairs of them. Additional details are included below regarding determining relative positions of images' viewing locations to each other in a common global coordinate system or other common frame of reference, including with respect to FIGS. 2A and 2B and their associated descriptions.

In addition, the generation of the floor map for the building may further include automatically determining, for each room in the building, the relative position within the room of any image viewing locations, and the positions of any connecting passages in and/or out of the room, such as based at least in part on automated analysis of each such image to determine directions to multiple features in the room (e.g., corners, doorways, etc.), thus allowing the relative position of the image to those multiple features to be determined from those determined directions. The connecting passages may include one or more of doorways, windows, stairways, non-room hallways, etc., and the automated analysis of the images may identify such features based at least in part on identifying the outlines of the passages, identifying different content within the passages than outside them (e.g., different colors, shading, etc.), etc. In addition, in at least some embodiments, the automated analysis of the images may further identify additional information such as an estimated room shape and/or room type, such as by using machine learning to identify features or characteristics corresponding to different room shapes and/ or room types—in other embodiments, at least some such information may be obtained in other manners, such as to receive estimated room shape information and optionally room type information from one or more users (e.g., based on user mark-up of one or more images in the room, such as to identify borders between walls, ceiling and floor; based on other user input; etc.). In some embodiments, the automated analysis of the images may further identify additional information in one or more images, such as dimensions of objects (e.g., objects of known size) and/or of some or all of the rooms, as well as estimated actual distances of images' viewing locations from walls or other features in their rooms. Additional details are included below regarding determining information from analysis of images that includes relative positions of images' viewing locations within rooms, including with respect to FIG. 2A and its associated description.

After positions of images' viewing locations in their enclosing rooms and relative to each other in a common global coordinate system have been determined, and estimated room shape information is obtained for the building's rooms, the generation of the floor map for the building may further include automatically determining initial placement positions of each room's estimated room shape, by placing a room's estimated room shape around any image viewing locations that the room contains. In at least some embodiments, such initial placements are performed separately for each room, but using the determined relative positions of the viewing locations in the common global coordinate system. In this manner, a rough approximation of the floor map may be determined. Additional details are included below regarding automatically determining initial placement positions of each room's estimated room shape in the common global coordinate system, including with respect to FIG. 2C and its associated description.

After determining the initial placement positions of each room's estimated room shape in the common global coordinate system, the generation of the floor map for the building may further include automatically determining final placements of the estimated room shapes for the building's rooms, including by considering positions of rooms relative to each other. The automatic determination of the final placements of the estimated room shapes to complete the floor map may include applying constraints of one or more types, including connecting passages between rooms (e.g., to co-locate or otherwise match connecting passage information in two or more rooms that the passage connects), and optionally constraints of other types (e.g., locations of the building exterior where rooms should not be located, shapes of adjacent rooms, overall dimensions of the building and/or of particular rooms in the building, an exterior shape of some or all of the building, etc.). In some embodiments and in situations with a building having multiple stories or otherwise having multiple levels, the connecting passage information may further be used to associate corresponding portions on different sub-maps of different floors or levels. Additional details are included below regarding automatically determining final placements of the estimated room shapes to complete the floor map, including with respect to FIGS. 2C and 2D and their associated descriptions.

In some embodiments, one or more types of additional processing may be performed, such as to determine additional mapping-related information for a generated floor map or to otherwise associate additional information with a generated floor map. As one example, one or more types of additional information about a building may be received and associated with the floor map (e.g., with particular locations in the floor map), such as additional images, annotations or other descriptions of particular rooms or other locations, overall dimension information, etc. As another example, in at least some embodiments, additional processing of images is performed to determine estimated distance information of one or more types, such as to measure sizes in images of objects of known size, and use such information to estimate room width, length and/or height. Estimated size information for one or more rooms may be associated with the floor map, stored and optionally displayed—if the size information is generated for all rooms within a sufficient degree of accuracy, a more detailed floor plan of the building may further be generated, such as with sufficient detail to allow blueprints or other architectural plans to be generated. In addition, if height information is estimated for one or more rooms, a 3D (three-dimensional) model of some or all of the 2D (two dimensional) floor map may be created, associated with the floor map, stored and optionally displayed. Such generated floor maps and optionally additional associated information may further be used in various manners, as discussed elsewhere herein.

The described techniques provide various benefits in various embodiments, including to allow floor maps of multi-room buildings and other structures to be automatically generated from images acquired in the buildings or other structures, including without having or using detailed information about distances from images' viewing locations to walls or other objects in a surrounding building or other structure. Furthermore, such automated techniques allow such a floor map to be generated much more quickly than previously existing techniques, and in at least some embodiments with greater accuracy, based at least in part on using information acquired from the actual building environment (rather than from plans on how the building should theoretically be constructed), as well as enabling the capture of changes to structural elements that occur after a building is initially constructed. Such described techniques further provide benefits in allowing improved automated navigation of a building by mobile devices (e.g., semi-autonomous or fully-autonomous vehicles), including to significantly reduce their computing power used and time used to attempt to otherwise learn a building's layout. In addition, in some embodiments the described techniques may be used to provide an improved GUI in which a user may more accurately and quickly obtain information about a building's interior (e.g., for use in navigating that interior), including in response to search requests, as part of providing personalized information to the user, as part of providing value estimates and/or other information about a building to a user, etc. Various other benefits are also provided by the described techniques, some of which are further described elsewhere herein.

For illustrative purposes, some embodiments are described below in which specific types of information are acquired, used and/or presented in specific ways for specific types of structures and by using specific types of devices—however, it will be understood that the described techniques may be used in other manners in other embodiments, and that the invention is thus not limited to the exemplary details provided. As one non-exclusive example, while floor maps are generated for houses that do not include detailed measurements for particular rooms or for the overall houses, and are used for display to assist viewers in navigating the houses, it will be appreciated that other types of floor maps or other mapping information may be similarly generated in other embodiments, including for buildings (or other structures or layouts) separate from houses, and that generated mapping information may be used in other manners in other embodiments. In addition, the term "building" refers herein to any partially or fully enclosed structure, typically but not necessarily encompassing one or more rooms that visually or otherwise divide the interior space of the structure—non-limiting examples of such buildings include houses, apartment buildings or individual apartments therein, condominiums, office buildings, commercial buildings or other wholesale and retail structures (e.g., shopping malls, department stores, warehouses, etc.), etc. The term "acquire" or "capture" as used herein with reference to a building interior, viewing location, or other location (unless context clearly indicates otherwise) may refer to any recording, storage, or logging of media, sensor data, and/or other information related to spatial and/or visual characteristics of the building interior or subsets thereof, such as by a recording device or by another device that receives information from the recording device. As used herein, the term "panorama image" refers to any visual representation that is based on, includes or is separable into multiple discrete component images originating from a substantially similar physical location in different directions and that depicts a larger field of view than any of the discrete component images depict individually, including images with a sufficiently wide-angle view from a physical location to include angles beyond that perceivable from a person's gaze in a single direction. The term "sequence" of viewing locations, as used herein, refers generally to two or more viewing locations that are each visited at least once in a corresponding order, whether or not other non-viewing locations are visited between them, and whether or not the visits to the viewing locations occur during a single continuous period of time or at multiple different time periods. In addition, various details are provided in the drawings and text for exemplary purposes, but are not intended to limit the scope of the invention. For example, sizes and relative positions of elements in the drawings are not necessarily drawn to scale, with some details omitted and/or provided with greater prominence (e.g., via size and positioning) to enhance legibility and/or clarity. Furthermore, identical reference numbers may be used in the drawings to identify similar elements or acts.

FIG. 1A is an example block diagram of various computing devices and systems that may participate in the described techniques in some embodiments. In particular, one or more linked panorama images 165 have been generated by an Interior Capture and Analysis ("ICA") system 160 that is executing on one or more server computing systems 180 in this example, such as with respect to one or more buildings or other structures—FIG. 1B shows one example of such linked panorama images for a particular house, as discussed further below. An FMGM (Floor Map Generation Manager) system 140 is further executing on one or more server computing systems to generate and provide building floor maps 145 and/or other mapping-related information (not shown) based on use of the linked panorama images 165 and optionally associated metadata about their acquisition and linking—additional details related to the automated operation of the FMGM system are included elsewhere herein, including with respect to FIGS. 2A-4B. In some embodiments, the ICA system 160 and FMGM system 140 may execute on the same server computing system(s), such as if both systems are operated by a single entity or are otherwise executed in coordination with each other (e.g., with some or all functionality of both systems integrated together into a larger system), while in other embodiments the FMGM system may instead obtain linked panorama images (or other images) from one or more external sources and optionally store them locally (not shown) with the FMGM system for further analysis and use.

One or more users (not shown) of one or more client computing devices 175 may further interact over one or more computer networks 170 with the FMGM system 140 and optionally the ICA system 160, such as to obtain, display and interact with a generated floor map and/or one or more associated linked panorama images (e.g., to change between a floor map view and a view of a particular panorama image at a viewing location within or near the floor map; to change the horizontal and/or vertical viewing direction from which a corresponding view of a panorama image is displayed, such as to determine a portion of a panorama image in a 3D spherical coordinate system to which a current user viewing direction is directed, and to render a corresponding planar image that illustrates that portion of the panorama image without the curvature or other distortions present in the original panorama image; etc.). In addition, while not illustrated in FIG. 1A, a floor map (or portion of it) may be linked to or otherwise associated with one or more other types of information, including for a floor map of a multi-story or otherwise multi-level building to have multiple associated sub-floor maps for different stories or levels that are interlinked (e.g., via connecting stairway passages), for a two-dimensional ("2D") floor map of a building to be linked to or otherwise associated with a three-dimensional ("3D") rendering of the building (referred to at times as a "dollhouse view"), etc. In addition, while not illustrated in FIG. 1A, in some embodiments the client computing devices 175 (or other devices, not shown), may receive and use generated floor maps and/or other generated mapping-related information in additional manners, such as to control or assist automated navigation activities by those devices (e.g., by autonomous vehicles or other devices), whether instead of or in addition to display of the generate information.

In the depicted computing environment of FIG. 1A, the network 170 may be one or more publicly accessible linked networks, possibly operated by various distinct parties, such as the Internet. In other implementations, the network 170 may have other forms. For example, the network 170 may instead be a private network, such as a corporate or university network that is wholly or partially inaccessible to non-privileged users. In still other implementations, the network 170 may include both private and public networks, with one or more of the private networks having access to and/or from one or more of the public networks. Furthermore, the network 170 may include various types of wired and/or wireless networks in various situations. In addition, the client computing devices 175 and server computing systems 180 may include various hardware components and stored information, as discussed in greater detail below with respect to FIG. 3.

In the example of FIG. 1A, ICA system 160 may perform automated operations involved in generating multiple panorama images at multiple associated viewing locations (e.g., in multiple rooms or other locations within a building or other structure and optionally around some or all of the exterior of the building or other structure), such as for use in generating and providing a representation of an interior of the building or other structure. For example, in at least some such embodiments, such techniques may include using one or more mobile devices (e.g., a smart phone held by a user, a camera held by or mounted on a user or the user's clothing, etc.) to capture video data from a sequence of multiple viewing locations (e.g., video captured at each viewing location while a mobile device is rotated for some or all of a full 360 degree rotation at that viewing location) within multiple rooms of a house (or other building), and to further capture data linking the multiple viewing locations, but without having distances between the viewing locations being measured or having other measured depth information to objects in an environment around the viewing locations (e.g., without using any depth-sensing sensors separate from the camera). After the viewing locations' videos and linking information are captured, the techniques may include analyzing video captured at each viewing location to create a panorama image from that viewing location that has visual data in multiple directions (e.g., a 360 degree panorama around a vertical axis), analyzing information to determine relative positions/directions between each of two or more viewing locations, creating inter-panorama positional/directional links in the panoramas to each of one or more other panoramas based on such determined positions/directions, and then providing information to display or otherwise present multiple linked panorama images for the various viewing locations within the house. Additional details related to embodiments of a system providing at least some such functionality of an ICA system are included in co-pending U.S. Non-Provisional patent application Ser. No. 15/649,434, filed Jul. 13, 2017 and entitled "Connecting And Using Building Interior Data Acquired From Mobile Devices" (which includes disclosure of an example BICA system that is generally directed to obtaining and using panorama images from within one or more buildings or other structures); in U.S. Non-Provisional patent application Ser. No. 15/950,881, filed Apr. 11, 2018 and entitled "Presenting Image Transition Sequences Between Viewing Locations" (which includes disclosure of an example ICA system that is generally directed to obtaining and using panorama images from within one or more buildings or other structures); and in U.S. Provisional Patent Application No. 62/744,472, filed Oct. 11, 2018 and entitled "Automated Mapping Information Generation From Inter-Connected Images"; each of which is incorporated herein by reference in its entirety.

FIG. 1B depicts a block diagram of an exemplary building interior environment in which linked panorama images have been generated and are ready for use by the FMGM system to generate and provide a corresponding building floor map, as discussed in greater detail with respect to FIGS. 2A-2D, as well as for use in presenting the linked panorama images to users. In particular, FIG. 1B includes a building 198 with an interior that was captured at least in part via multiple panorama images, such as by a user carrying a mobile device (not shown) with image acquisition capabilities as it is moved through the building interior to a sequence of multiple viewing locations 210. An embodiment of the ICA system (e.g., ICA system 160 on server computing system(s) 180, a copy of some or all of the ICA system executing on the user's mobile device, etc.) may automatically perform or assist in the capturing of the data representing the building interior, as well as further analyze the captured data to generate linked panorama images providing a visual representation of the building interior. While the mobile device of the user may include various hardware components, such as a camera, one or more sensors (e.g., a gyroscope, an accelerometer, a compass, etc., such as part of one or more IMUs, or inertial measurement units, of the mobile device; an altimeter; light detector; etc.), a GPS receiver, one or more hardware processors, memory, a display, a microphone, etc., the mobile device may not in at least some embodiments have access to or use equipment to measure the depth of objects in the building relative to a location of the mobile device, such that relationships between different panorama images and their viewing locations may be determined in part or in whole based on matching features in different images and/or by using information from other of the listed hardware components, but without using any data from any such depth sensors. In addition, while directional indicator 109 is provided for reference of the viewer, the mobile device and/or ICA system may not use such absolute directional information in at least some embodiments, such as to instead determine relative directions and distances between panorama images 210 without regard to actual geographical positions or directions.

In operation, a user associated with the mobile device arrives at a first viewing location 210A within a first room of the building interior (in this example, an entryway from an external door 190 to the living room), and captures a view of a portion of the building interior that is visible from that viewing location 210A (e.g., some or all of the first room, and optionally small portions of one or more other adjacent or nearby rooms, such as through doors, halls, stairs or other connecting passages from the first room) as the mobile device is rotated around a vertical axis at the first viewing location (e.g., with the user turning his or her body in a circle while holding the mobile device stationary relative to the user's body). The view capture may be performed by recording a video and/or taking a succession of images, and may include a number of objects or other features (e.g., structural details) that may be visible in images (e.g., video frames) captured from the viewing location—in the example of FIG. 1B, such objects or other features include the doorways 190 and 197 (e.g., with swinging and/or sliding doors), windows 196, corners or edges 195 (including corner 195-1 in the northwest corner of the building 198, and corner 195-2 in the northeast corner of the first room), furniture 191-193 (e.g., a couch 191; chairs 192, such as 192-1 and 192-2; tables 193, such as 193-1 and 193-2; etc.), pictures or paintings or televisions or other objects 194 (such as 194-1 and 194-2) hung on walls, light fixtures, etc. The user may also optionally provide a textual or auditory identifier to be associated with a viewing location, such as "entry" 142a for viewing location 210A or "living room" 142b for viewing location 210B, while in other embodiments the ICA system may automatically generate such identifiers (e.g., by automatically analyzing video and/or other recorded information for a building to perform a corresponding automated determination, such as by using machine learning) or the identifiers may not be used.

After the first viewing location 210A has been adequately captured (e.g., by a full rotation of the mobile device), the user may proceed to a next viewing location (such as viewing location 210B), optionally recording video and/or other data from the hardware components (e.g., from one or more IMUs, from the camera, etc.) during movement between the viewing locations. At the next viewing location, the user may similarly use the mobile device to capture one or more images from that viewing location. This process may repeat from some or all rooms of the building and optionally external to the building, as illustrated for viewing locations 210C-210J. The acquired video and/or other images for each viewing location are further analyzed to generate a panorama image for each of viewing locations 210A-210J, including in some embodiments to match objects and other features in different images. In addition to generating such panorama images, further analysis may be performed in order to 'link' at least some of the panoramas together with lines 215 between them, such as to determine relative positional information between pairs of viewing locations that are visible to each other and, to store corresponding inter-panorama links (e.g., links 215-AB, 215-BC and 215-AC between viewing locations A and B, B and C, and A and C, respectively), and in some embodiments and situations to further link at least some viewing locations that are not visible to each other (e.g., link 215-BE between viewing locations B and E).

Figure 1D:
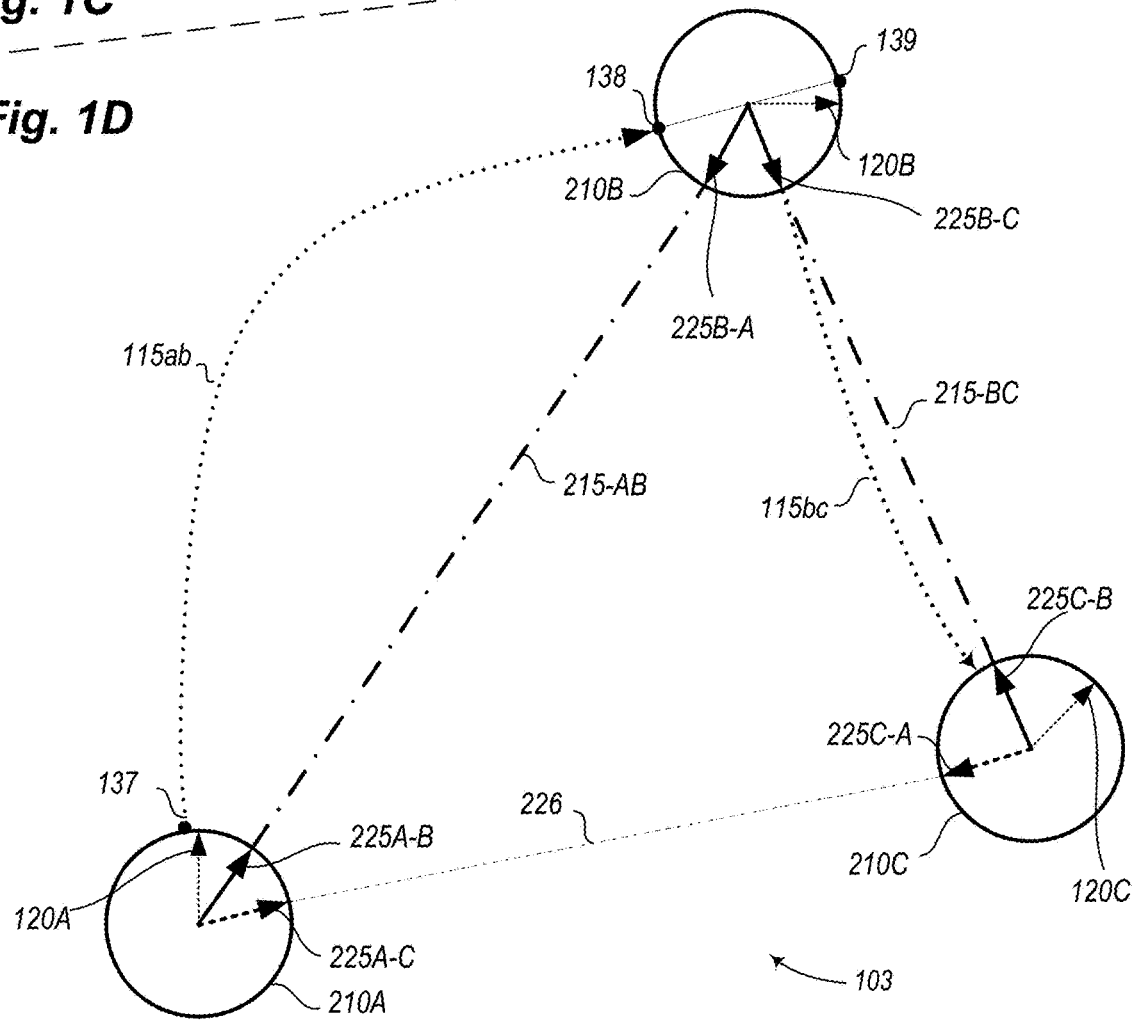

FIGS. 1C and 1D provide further details regarding one example of performing linking operations using panorama images such as images 210 of FIG. 1B, including to determine relative positional information between the viewing locations for use in inter-connecting panorama images or other visual information corresponding to those viewing locations. While the example of FIGS. 1C and 1D uses information about a travel path that the user takes between viewing locations to perform linking operations between panorama images for those viewing locations, linking operations between panorama images may be performed in part or in whole using other techniques in other embodiments, such as by identifying the same features in different panorama images that have overlapping fields of view (e.g., for different panorama images in the same room) and by using the relative locations of those features in the different images to determine relative position information between the viewing locations of the panorama images, with additional related details discussed with respect to FIG. 2A.

In particular, FIG. 1C in this example illustrates building 198 in a manner similar to that illustrated in FIG. 1B, but with additional information shown that may be of use in determining connections between panorama images for different viewing locations. In the example of FIG. 1C, a travel path 115 is illustrated that a user takes between viewing locations carrying mobile device 185, while various other details from FIG. 1B regarding the building 198 are not included in FIG. 1C.

FIG. 1D provides additional information 103, including about portions of the path 115ab and 115bc that reflect the user moving from viewing location 210A to viewing location 210B, and subsequently from viewing location 210B to 210C, respectively. It will be appreciated that the order of obtaining such linking information may vary, such as if the user instead started at viewing location 210B and captured linking information as he or she traveled along path 115bc to viewing location 210C, and later proceeded from viewing location 210A to viewing location 210B along travel path 115ab with corresponding linking information captured (optionally after moving from viewing location 210C to 210A without capturing linking information). In this example, FIG. 1D illustrates that the user departs from the viewing location 210A at a point 137 in a direction that is just west of due north (as previously indicated with respect to directional indicator 109 of FIG. 1B), proceeding in a primarily northward manner for approximately a first half of the travel path 115ab, and then beginning to curve in a more easterly direction until arriving at an incoming point 138 to viewing location 210B in a direction that is mostly eastward and a little northward. In order to determine the departure direction from point 137 more specifically, including relative to the direction 120A at which the video acquisition previously began for viewing location 210A (and at which the resulting panorama image begins), initial video information captured as the user travels along travel path 115ab may be compared to the frames of the panorama image for viewing location 210A in order to identify matching frames/images. In particular, by matching one or more best frames in that panorama image that correspond to the information in the initial one or more video frames/images taken as the user departs from point 137, the departure direction from point 137 may be matched to the viewing direction for acquiring those matching panorama images—while not illustrated, the resulting determination may correspond to a particular degree of rotation from the starting direction 120A to the one or more matching frames/images of the panorama image for that departure direction. In a similar manner, in order to determine the arrival direction at point 138 more specifically, including relative to the direction 120B at which the video acquisition began for viewing location 210B (and at which the resulting panorama image begins), final video information captured as the user travels along travel path 115ab may be compared to the frames of the panorama image for viewing location 210B in order to identify matching frames/images, and in particular to frames/images in direction 139 (opposite to the side of viewing location 210B at which the user arrives).

While such departure direction and arrival direction would allow the actual relative direction 215-AB between the viewing locations 210A and 210B to be determined if the travel path 115ab was substantially straight, that is not the case here—instead, in order to determine the direction 215-AB, acceleration data captured as part of the linking information for the travel path 115ab is analyzed to identify user velocity and location along the travel path 115ab, in order to model the resulting relative locations of the travel path between starting point 137 and arrival point 138. In this example, the acceleration data acquired for the north-south direction (e.g., from one or more IMU units in a mobile device carried by the user) indicates that there is an initial significant acceleration spike in the northerly direction as the user began moving, which then drops to near zero as the user maintains a constant velocity in a generally northern direction along the middle portion of the travel path 115*ab*, and then begins a longer but less sharp acceleration in the southerly direction as the user curves to a primarily easterly direction toward viewing location 210B and decelerates at arrival. The acceleration data may be integrated to determine corresponding north-south velocity information, and then further integrated to determine location information for each data point. By combining the determined velocity and location information, an amount of north-south movement by the user along travel path 115*ab* may be determined, corresponding to an aggregate amount of north-south distance traveled between viewing locations 210A and 210B. In a similar manner, acceleration and velocity information may be determined in an east-west direction for the travel path 115*ab* as the user moves along the travel path, with the resulting double integration in velocity and location data providing an aggregate amount of east-west distance that the user travels along the travel path 115*ab*. By combining the aggregate north-south and east-west distances (and assuming in this example that no height change occurred) with the determined departure and arrival information, a total distance traveled between viewing locations 210A and 210B in a corresponding direction 215-AB is determined (with direction 215-AB being a two-way direction in this example, from viewing location 210A to 210B and from viewing location 210B to 210A).

Based on a similar analysis of departing direction from viewing location 210B, arrival direction at viewing location 210C, and intervening velocity and location for some or all data points for which acceleration data is captured along the travel path 115*bc*, the user's movement for travel path 115*bc* may be modeled, and resulting direction 215-BC and corresponding distance between viewing locations 210B and 210C may be determined. As a result, inter-panorama link 225B-C may be determined in a direction 215-BC to viewing location 210C, with corresponding information included in the panorama image generated at viewing location 210B, and inter-panorama link 225C-B may similarly be determined in direction 215-BC to viewing location 210B, with corresponding information included in the panorama generated at viewing location 210C. Similarly, inter-panorama link 225A-B from viewing location 210A to 210B may be determined in a direction 215-AB to viewing location 210B from 210A, with corresponding information included in the panorama image generated at viewing location 210A, and inter-panorama link 225B-A may similarly be determined in direction 215-AV from viewing location 210B to viewing location 210A, with corresponding information included in the panorama generated at viewing location 210B.

Despite the lack of linking information captured between viewing locations 210A and 210C (e.g., because the user did not travel along a path between those viewing locations, because linking information was not captured as a user did travel along such a path, etc.), information 103 further illustrates an example of direction 226 that may optionally be determined between viewing locations 210A and 210C based at least in part on the analysis of linking information for travel paths 115*ab* and 115*bc* (and with corresponding inter-panorama links 225A-C and 225C-A being generated in direction 226 and included in the panorama images for viewing locations 210A and 210C, respectively). In particular, even if an absolute location of viewing locations 210A, 210B and 210C are not known from the analysis of the linking information for travel paths 115*ab* and 115*bc*, relative locations of those viewing locations may be determined in a manner discussed above, including distances and directions between viewing locations 210A and 210B and between viewing locations 210B and 210C. In this manner, the third side of the resulting triangle having determined lines 215-AB and 215-BC may be determined to be line 226 using geometrical analysis, despite the lack of direct linking information between viewing locations 210A and 210C. It will be further noted that the analysis performed with respect to travel paths 115*ab* and 115*bc*, as well as the estimation of direction and distance corresponding to 226, may be performed in this example regardless of whether or not viewing locations 210A, 210B and/or 210C are visible to each other—in particular, even if the three viewing locations are in different rooms and/or are obscured from each other by walls (or by other structures or impediments), the analysis of the linking information may be used to determine the relative locations discussed above (including directions and distances) for the various viewing locations. It will be appreciated that the techniques illustrated with respect to FIGS. 1C and 1D may be continued for all viewing locations in building 198, resulting in a set of linked panorama images corresponding to viewing locations 210A-H, or otherwise in other similar buildings or other structures.

Figure 2A:
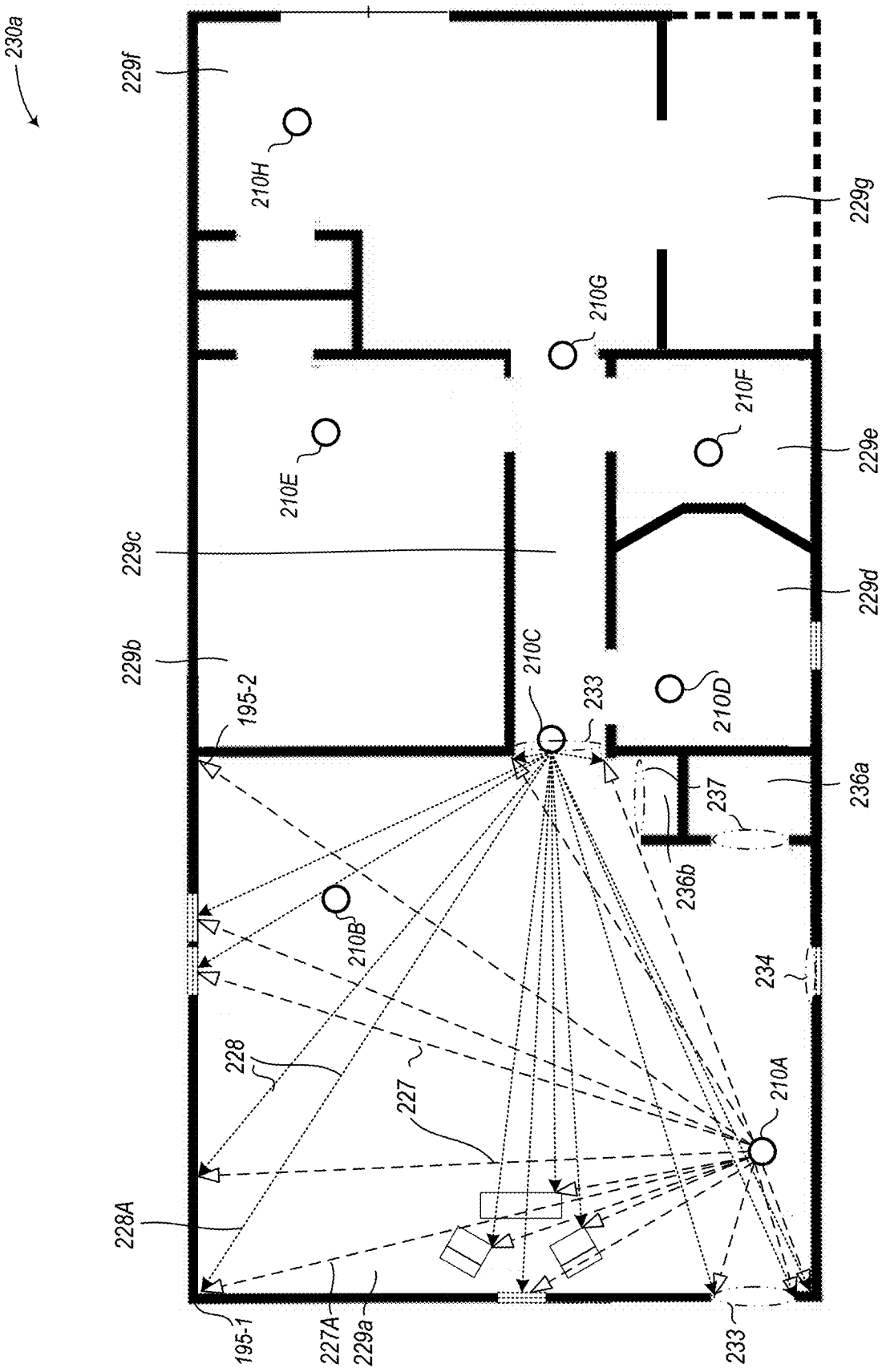
FIGS. 2A-2D illustrate examples of automatically generating and presenting a floor map for a building using inter-connected panorama images of the building interior.

Additional details related to determining relative positions between viewing locations using analysis of their panorama images is discussed with respect to FIG. 2A, and further details related to embodiments of generating linking information between panorama images, including using travel path information and/or features visible in multiple images, are included in co-pending U.S. Non-Provisional patent application Ser. No. 15/649,434, filed Jul. 13, 2017 and entitled "Connecting And Using Building Interior Data Acquired From Mobile Devices" (which includes disclosure of an example BICA system that is generally directed to obtaining and using panorama images from within one or more buildings or other structures), which is incorporated herein by reference in its entirety.

Figure 1E:
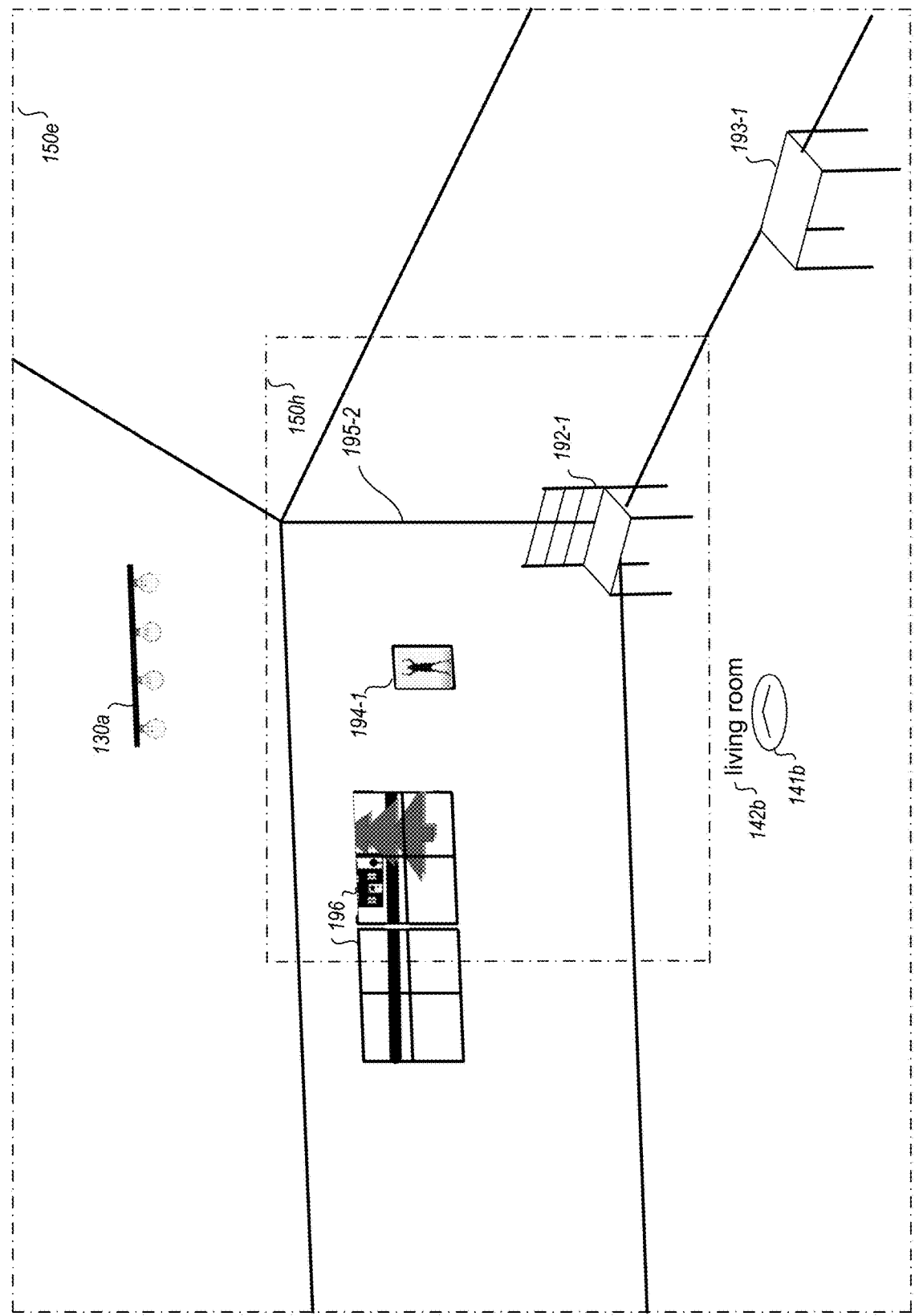

FIGS. 1E-1H provide further examples of displaying panorama images acquired at viewing locations 210. In particular, FIG. 1E illustrates an example image 150*e* that is generated from the panorama image at viewing location 210A toward the viewing location 210B, such as to be pointed directly along the inter-panorama link 215-AB in both the horizontal and vertical directions. Since image 150*e* is in the direction of the viewing location 210*b* but from a greater distance with a wider angle of view, a subset of image 150*e* corresponds to an image view 150*h* that would be visible in the same direction from the panorama image at viewing location 210B, as shown in FIG. 1E with dashed lines for the purpose of illustration, although such dashed lines may also not be displayed as part of the image 150*e* shown to a user. The image 150*e* includes several objects in the surrounding environment of the living room, such as windows 196, a picture or painting 194-1, chair 192-1, table 193-1, a lighting fixture 130*a*, and inter-wall and floor and ceiling borders including border 195-2. In addition, because the panorama images for viewing locations 210A and 210B are linked, the image 150*e* includes a generated virtual user-selectable control 141*b* to visually indicate that the user may select that control to move from the location at which image 150*e* was taken (the viewing location 210A) to the linked panorama image at viewing location 210B, with the additional text label 142*b* of "living room" from FIG. 1B added along with the user-selectable control 141*b* to reference that viewing location 210B.

Figure 1F:
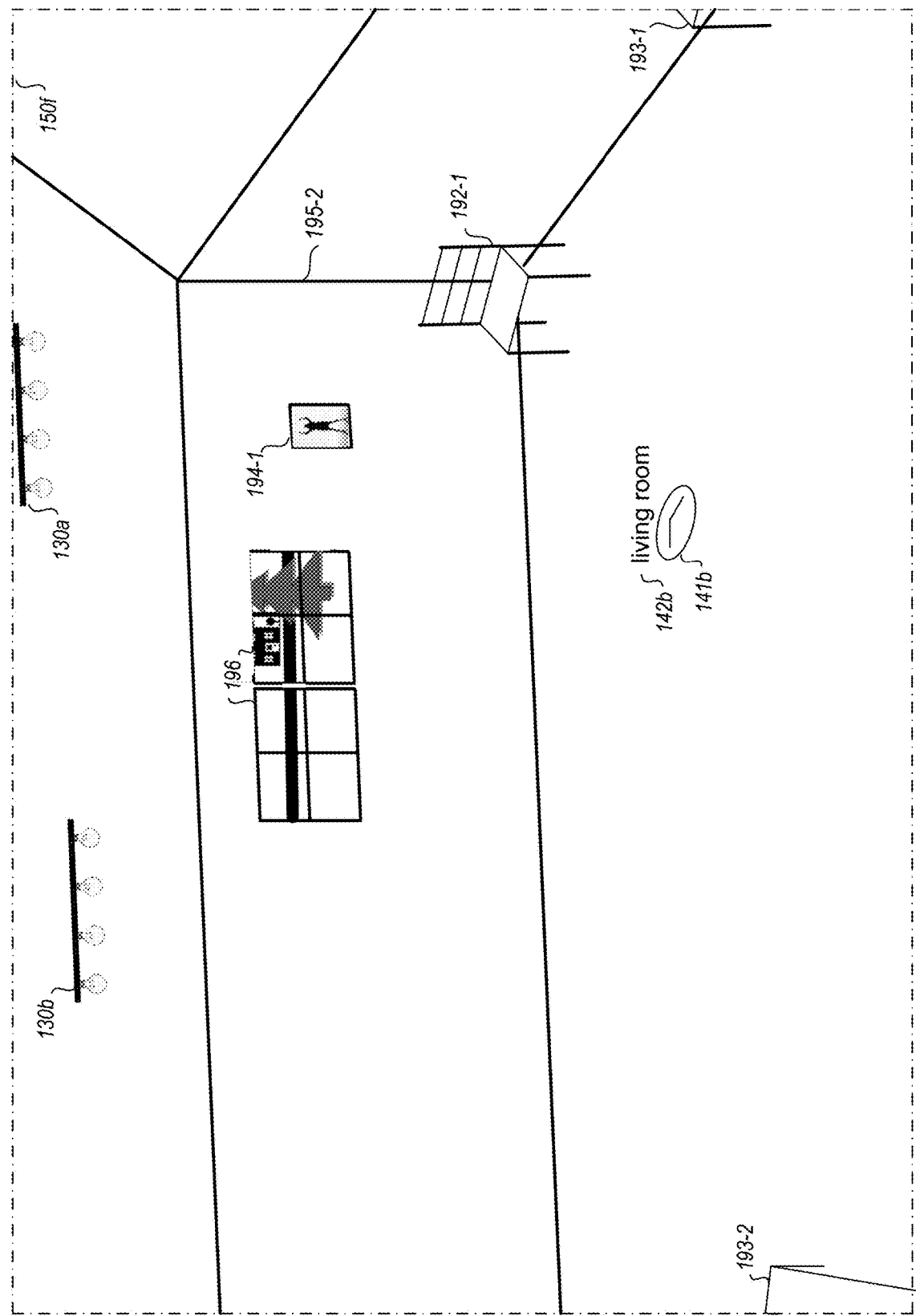
Figure 1G:
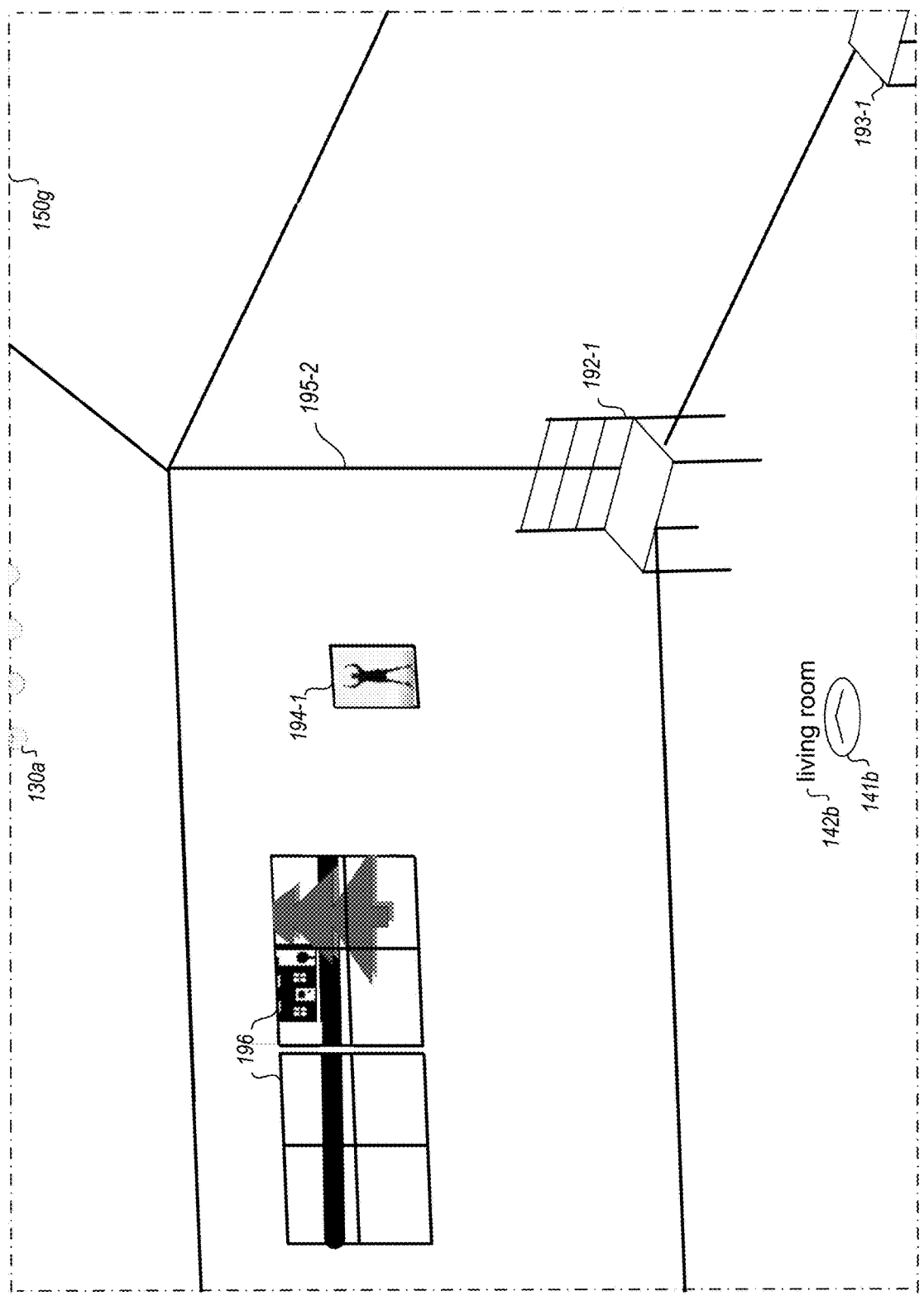

The user may further manipulate the displayed panorama image view 150*e* of FIG. 1E in various ways, with FIG. 1F illustrating an altered view 150*f* from the same panorama image corresponding to the user dragging, scrolling or otherwise moving the view direction to the left. Altered view 150*f* includes some of the same information as view 150*e*, and further includes additional objects visible to the left in the living room, including additional lighting FIG. 130*b* and table 193-2. The representation 141*b* and corresponding text 142*b* have also been altered to reflect the changed direction to viewing location 210B from the view 150*f*. FIG. 1G illustrates a different altered view 150*g* that the user may initiate from view 150*e* of FIG. 1E, which in this example corresponds to the user zooming in, such that the objects from FIG. 1E which continue to be visible in FIG. 1G are shown in an enlarged form.

Figure 1H:
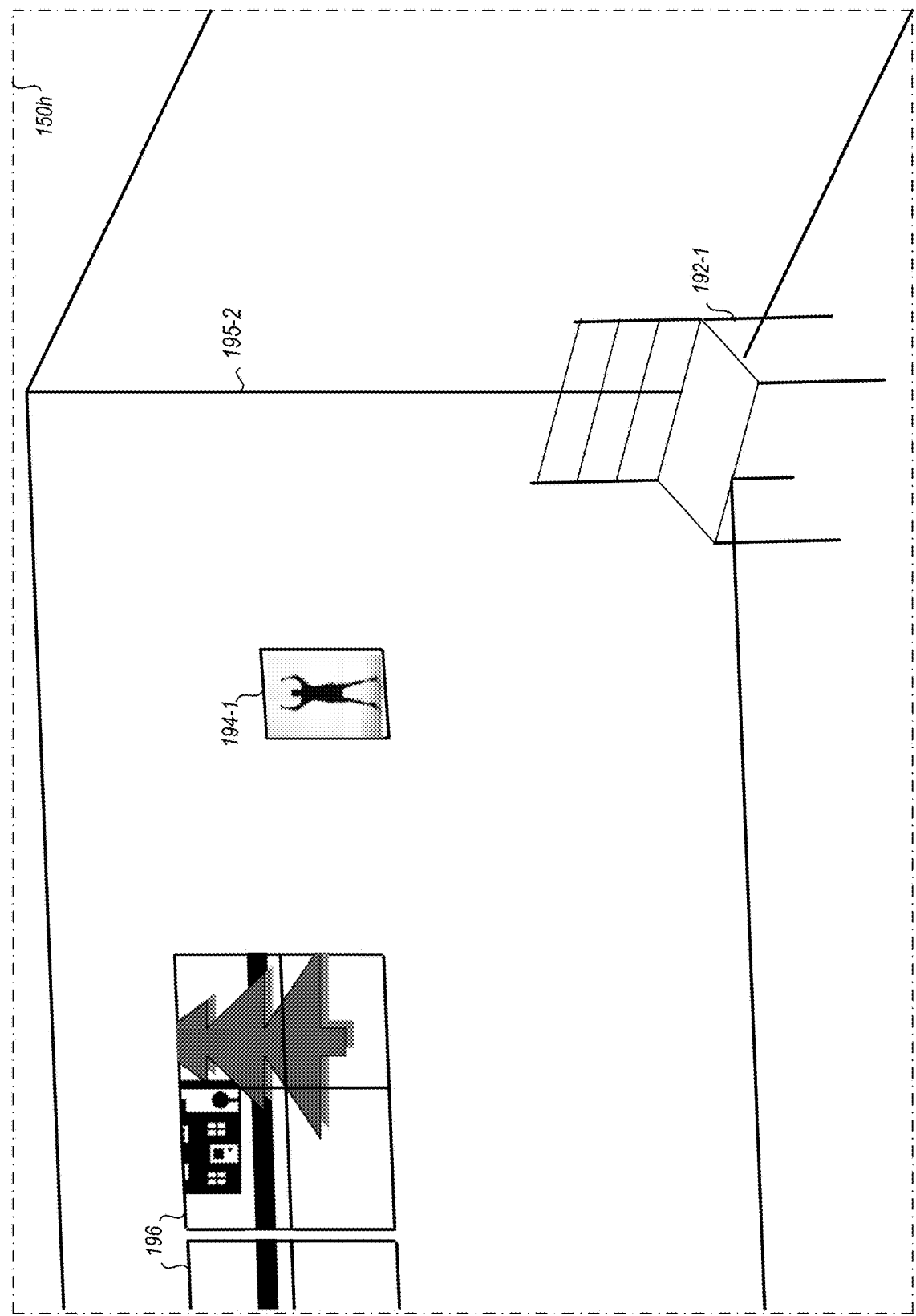

FIG. 1H continues the example, and illustrates the effect of selecting the control 141*b* in one of views 150*e*, 150*f* or 150*g*, to cause a view 150*h* of the panorama image at viewing location 210B to be shown. In this example, since the view from the viewing location 210B's panorama image was initiated from viewing location 210A's panorama image, the initial view 150*h* shown in FIG. 1H is in the direction of the link 215-AB between the two viewing locations (as also shown in FIG. 1E), although the user can subsequently manipulate the panorama image for viewing location 210B in a manner similar to that discussed for the panorama image for viewing location 210A. Initial images to be displayed for viewing location 210B are able to be selected in other manners in other embodiments, with one example being the user changing from the panorama image at viewing location 210C to the panorama image of viewing location 210B, in which case the initial view of viewing location 210B's panorama image in this example would be in the direction of link 215-BC. In some embodiments, various transition effects may be displayed as views change between panorama images at different viewing locations, with additional details regarding examples of some such transition effects included in U.S. Non-Provisional patent application Ser. No. 15/950,881, filed Apr. 11, 2018 and entitled "Presenting Image Transition Sequences Between Viewing Locations," which is incorporated herein by reference in its entirety.

Various details are provided with respect to FIGS. 1A-1H, but it will be appreciated that the provided details are non-exclusive examples included for illustrative purposes, and other embodiments may be performed in other manners without some or all such details.

FIGS. 2A-2D illustrate examples of automatically generating and presenting a floor map for a building using inter-connected panorama images of the building interior, such as based on the building 198 and inter-connected panorama images 210 discussed in FIGS. 1B-1H.

In particular, FIG. 2A illustrates information 230*a* about analysis techniques that may be performed using information in various panorama images (or other types of images) in order to determine approximate position of each viewing location within its room, as well as to optionally determine additional information as well (e.g., locations of connecting passages between rooms, relative positional information between viewing locations, estimates of room shapes, determinations of room types, etc.). In this example, various details are discussed with respect to the panorama images acquired at viewing locations 210A and 210C in the living room 229*a* of the illustrated building—it will be appreciated that similar analysis may be performed for that same room by using the panorama image information for viewing location 210B (e.g., in comparison to the panorama images for viewing locations 210A and 210C individually in a pairwise fashion, or instead to simultaneously compare the panorama images for all three viewing locations), and that similar techniques may be performed for the other rooms 229*b*-229*f*. In this example, room 229*g* does not have any viewing locations within or closely adjacent to the room, and thus an analysis may not be performed for it with respect to viewing location position within rooms, although information from other viewing locations with visibility into room 229*g* (e.g., viewing locations 210G and 210H) may be used at least in part for other types of information acquired from analysis of panorama images. In addition, for purposes of this example, small areas such as closet 236*a* or alcove/nook 236*b* are not analyzed as a separate room, but are instead treated as part of the larger containing room 229*a* (optionally as unmapped space within the room), although in other embodiments such small areas could instead be separately represented (including to optionally have one or more viewing locations located within them). Similarly, while hallway 229*c* is modeled as a separate room in this example, in other embodiments such hallways may instead be treated as part of one or more rooms connecting to the hallway, or instead the hallway may be treated as a connecting passage between rooms rather than as a separate room.

In particular, in the example of FIG. 2A, individual images from within two or more panorama images (e.g., corresponding to separate video frames from recorded video used to generate the panorama images) may be analyzed to determine overlapping features and other similarities between such images. In the example of FIG. 2A, additional details are shown in room 229*a* for viewing locations 210A and 210C, such as based on structural features (e.g., corners, borders, doorways, window frames, etc.) and/or content features (e.g., furniture) of the room. As non-exclusive illustrative examples, the additional Information in FIG. 2A illustrates various viewing directions 227 from viewing location 210A that each has an associated frame in the panorama image for that viewing location, with the illustrated viewing directions 227 corresponding to various features in the room 229*a*—it will be appreciated that only a subset of the possible features are illustrated. Similarly, the additional information also illustrates various viewing directions 228 from viewing location 210C that each has an associated frame in the panorama image for that viewing location, with the illustrated viewing directions 228 generally corresponding to the same features in the room 229*a* as the viewing directions 227—however, some features may be visible from only one viewing location, such as for the northeast corner 195-2, and thus may not be used for the comparison and analysis of the panorama images from these two viewing locations (although it may be used for the comparison of panorama images from viewing locations 210A and 210B). Using feature 195-1 in the northwest corner of the room 229*a* as an example, a corresponding viewing direction 227A in the direction of that feature from viewing location 210A is shown, with an associated frame in viewing location 210A's panorama image being determined, and a corresponding viewing direction 228A with associated frame from viewing location 210C to that feature is also shown—given such matching frames/images to the same feature in the room from the two viewing locations, information in those two frames/images may be compared in order to determine a relative rotation and translation between viewing locations 210A and 210C (assuming that sufficient overlap in the two images is available). It will be appreciated that multiple frames from both viewing locations may include at least some of the same feature (e.g., corner 195-1), and that a given such frame may include other information in addition to that feature (e.g., portions of the west and north walls, the ceiling and/or floor, possible contents of the room, etc.)—for the purpose of this example, the pair of frames/images being compared from the two viewing locations corresponding to feature 195-1 may include the image/frame from each viewing location with the largest amount of overlap, although in actuality each image/frame from viewing location 210A in the approximate direction of 227A that includes any of corner 195-1 may be compared to each image/frame from viewing location 210C in the approximate direction of 228A that includes any of corner 195-1 (and similarly for any other discernible features in the room). Furthermore, by using the determined relative rotation and translation for multiple such matching frames/images for one or more features, the precision of the positions of the corresponding viewing locations may be increased.

After analyzing multiple such features in room 229*a* between the panorama images from the viewing locations 210A and 210C, various information may be determined regarding the positions of the viewing locations 210A and 210C in the room 229*a*. Note that in this example the viewing location 210C is on the border between rooms 229*a* and 229*c*, and thus may provide information for and be associated with one or both of those rooms, as well as may provide some information regarding room 229*d* based on overlap through the doorway to that room with the panorama image acquired from viewing location 210D. In addition, the image analysis identifies various other features of the room for possible later use, including connecting doorway passages 233 in and/or out of the room (as well as interior doorways or other openings 237 within the room), connecting window passages 234 (e.g., from the room to an exterior of the building), etc.—it will be appreciated that the example connecting passages are shown for only a subset of the possible connecting passages, and that some types of connecting passages (e.g., windows, interior doorways or other openings, etc.) may not be used in some embodiments.

While illustrated only with respect to room 229*a* and two viewing locations, it will be appreciated that similar analysis may be performed for each of the viewing locations 210A-210H, and with respect to some or all of the rooms in the building. In addition, analysis of information in the images may further be used to determine additional position information in the room for one or more such viewing locations, such as to further determine specific dimensions of distances from a viewing location to one or more nearby walls or other structural features of the room—information for such dimension determination may be determined in some embodiments by using sizes of known objects (e.g., door frames, door handles, lightbulbs, etc.), and extrapolating to corresponding sizes of other features and distances between locations. In this manner, such an analysis may provide the position of each viewing location in a room, of connecting passage locations for the room, and optionally an estimate of room shape.

In some embodiments, an automated determination of a position within a room of a viewing location and/or of an estimated room shape may be further performed using machine learning, such as via a deep convolution neural network that estimates a 3D layout of a room from a panorama image (e.g., a rectangular, or "box" shape; non-rectangular shapes; etc.). Such determination may include analyzing the panorama image to align the image so that the floor is level and the walls are vertical (e.g., by analyzing vanishing points in the image) and to identify and predict corners and boundaries, with the resulting information fit to a 3D form (e.g., using 3D layout parameters, such as for an outline of floor, ceiling and walls to which image information is fitted). One example of a system for estimating room shape from an image is RoomNet (as discussed in "RoomNet: End-to-End Room Layout Estimation" by Chen-Yu Lee et al., 2017 IEEE International Conference On Computer Vision, August 2017), and another example of a system for estimating room shape from an image is Room Net (as discussed in "RoomNet: End-to-End Room Layout Estimation" by Chen-Yu Lee et al., 2018 IEEE/CVF Conference On Computer Vision And Pattern Recognition, June 2018). In addition, in some embodiments humans may provide manual indications of estimated room shapes for rooms from images, which may be used in generation of a corresponding floor map, as well as later used to train models for use in corresponding subsequent automated generation of room shapes for other rooms from their images. In some embodiments, certain assumptions may be employed for automated analysis of image(s) of at least some rooms, such as one or more of the following: the room shape should be predominantly rectangular/cuboid; if the room shape is not predominantly rectangular/cuboid, multiple viewing locations should be used within the room; the room should be at least a minimum number of visible corners and/or walls (e.g., 3, 4, etc.); the room should have a level floor and walls perpendicular to the floor; the walls should be flat rather than curved; the image is acquired from a camera at a specified level above the floor (e.g., 5 feet, approximately midway between floor and ceiling, etc.); the image is acquired from a camera at a specified distance from one or more walls (e.g., 4 feet, 5 feet, 6 feet, 7 feet, 8 feet, 9 feet, 10 feet, etc.); etc. In addition, if multiple room shape estimates are available for a room (e.g., from multiple viewing locations within the room), one may be selected for further use (e.g., based on positions of the viewing locations within the room, such as a most central), or instead the multiple shapes estimates may be combined, optionally in a weighted manner. Such automated estimation of a room shape may further be performed in at least some embodiments by using one or more techniques such as SfM (structure from motion), Visual SLAM (simultaneous localization and mapping), sensor fusion, etc.

Figure 2B:
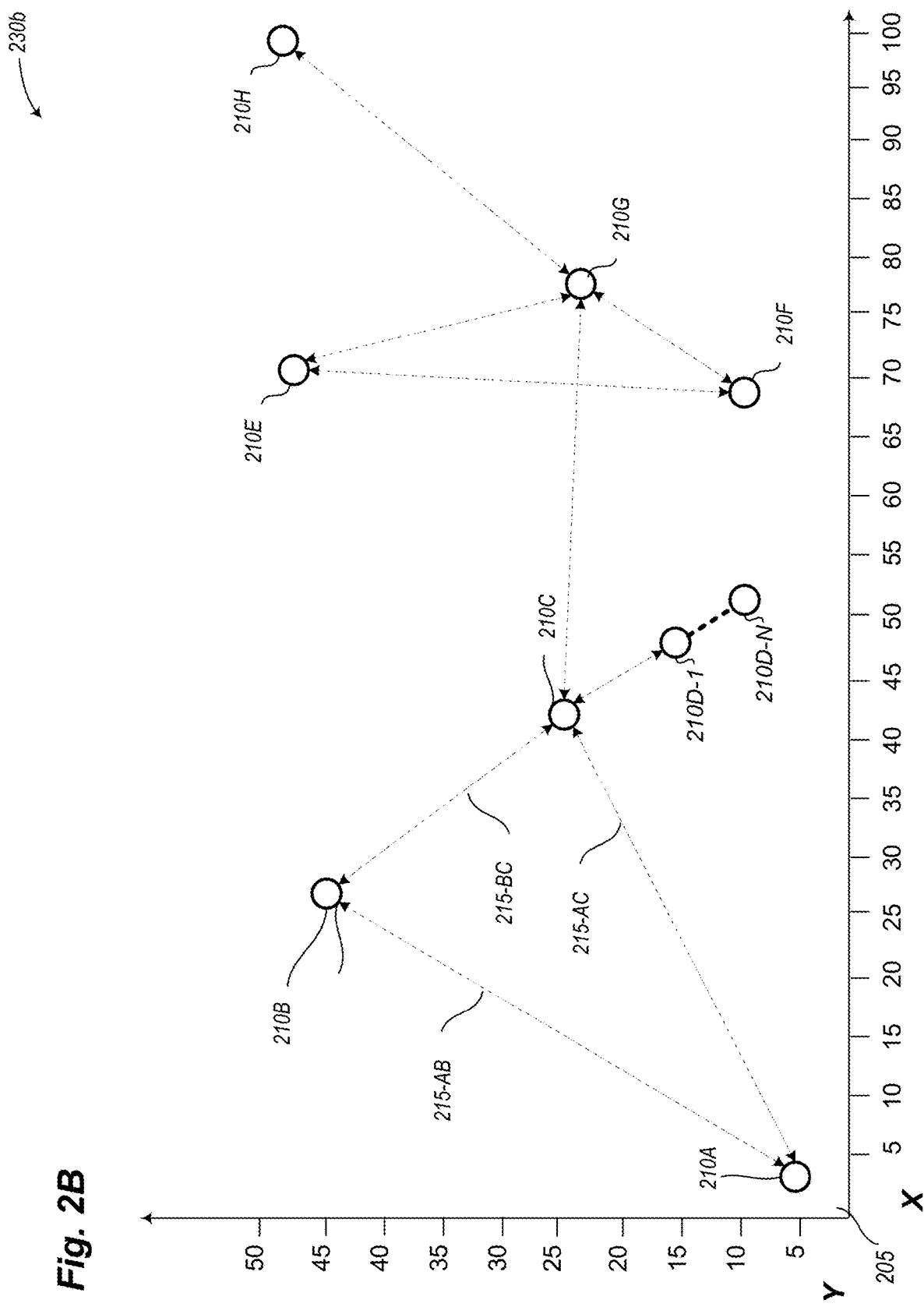

FIG. 2B illustrates information 230*b* about relative position information that has been determined for the viewing locations 210A-210H and their corresponding panorama images in a common global coordinate system or other common frame of reference. As previously noted with respect to FIGS. 1C-1D and FIG. 2A, relative positional information between two or more panorama images may be determined in various manners in various embodiments, including by analyzing metadata about the panorama acquisition, such as linking information as discussed with respect to FIGS. 1C-1D, and/or by analyzing the respective panorama images to determine common objects or features visible in multiple panorama images, as discussed further with respect to FIG. 2A. It will be noted that, as the number of viewing locations that are visible from each other increases, the precision of a location of a particular viewing location may similarly increase, such as for embodiments in which the relative position information is determined based at least in part on matching corresponding objects or other features in the panorama images. In this example, the panorama image acquired at viewing location 210D may be visible from only one other viewing location (viewing location 210C), and the information 230*b* of FIG. 2B indicates that there may be some uncertainty with respect to the position of viewing location 210D in such a situation, such as is illustrated by indicators 210D-1 to 210D-N (in which the angle or direction between viewing locations 210C and 210D may be known, but in which the distance between viewing locations 210C and 210D has increased uncertainty). In other embodiments, such as when linking information is used for determining the relative positions, and/or if other information about dimensions is available (e.g., from other building metadata that is available, from analysis of sizes of known objects in images, etc.), such uncertainty may be reduced or eliminated. In this case, for example, while viewing location 210I outside the building may not be used as part of the final generation of the floor map due to its exterior location, its inter-connection to viewing location 210H may nonetheless be used when determining the relative global position of viewing location 210H, such that the relative global position of viewing location 210H is not shown with the same type of uncertainty in this example as that of viewing location 210D.

Figure 2C:
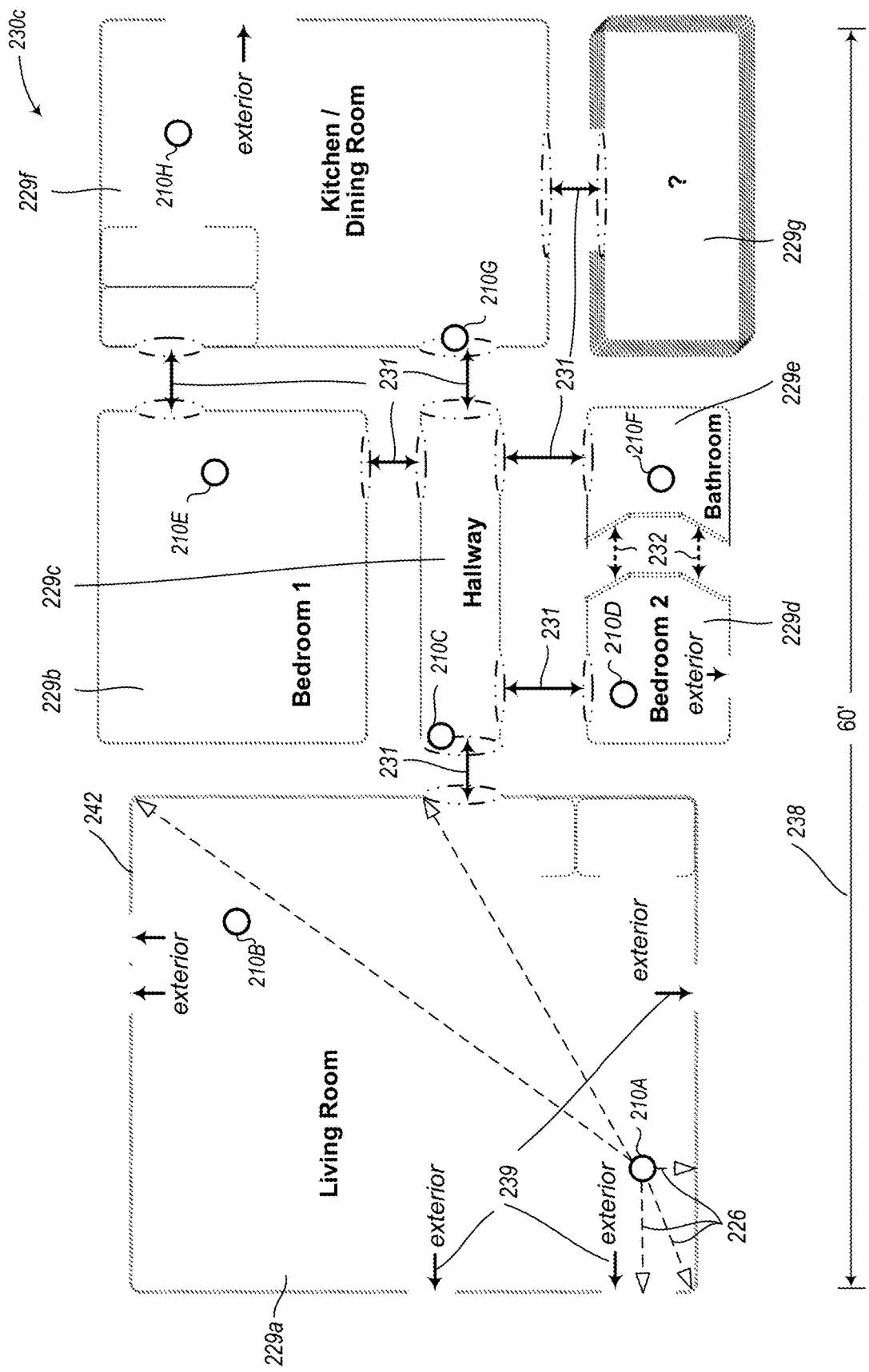

FIG. 2C illustrates additional information 230c corresponding to, after relative global positions of viewing locations are determined and estimated room shapes are obtained, performing an initial placement of each of the room's estimated room shape at an approximate position relative to any viewing locations in that room, such as in a manner independent of any of the other rooms. By performing such initial placement around the viewing locations' determined relative global positions, an initial approximation of the floor map for the building may be obtained.

In particular, a viewing location's position with respect to features in the room may be determined (as discussed with respect to FIG. 2A), and FIG. 2C further illustrates information 226 with respect to viewing location 210A to indicate such relative angles and optionally distance of the viewing location 210A to a southwest corner of the room, to a south wall of the room, and to the exterior doorway, with various other possible features (e.g., interior doorway to the hallway, northeast corner 195-2, etc.) also available to be used in this manner. Such information may be used to provide an initial estimated position of the estimated room shape 242 for room 229a around viewing location 210A, such as by minimizing the total error for the initial placement of the estimated room shape with respect to each such feature's measured position information for the viewing location. When multiple viewing locations are included in a room, including at the viewing locations 210A and 210B for room 229a (and viewing location 210C if associated with room 229a), the relative positioning of the estimated room shape 242 for room 229a may be further performed for each such viewing location, such as by aggregating or otherwise combining relative position information for some or all such viewing locations. While additional details regarding such initial room shape placement are illustrated with respect to room 229a, the approximate positioning of estimated room shapes for other rooms 229b-229f is similarly performed for each of those other rooms. As previously noted, room 229g did not have any viewing location within the room, and thus sufficient information may not be available to determine information such as a room shape and/or a relative position information of room 229g to other viewing locations external to the room 229g. However, even in such a situation, some information may be available regarding the position of the room 229g, such as based on connecting passage information 231 between the rooms 229f and 229g, and optionally using shape information about other potentially adjacent rooms 229f and 229e (such as if a modifiable presumption is used that the additional room 229g fits together with adjacent rooms whose shapes are known).

After such an initial placement of each room's estimated room shape is made around the determined relative global positions of the viewing locations in the building's interior, additional information may be used to adjust the initial placements into final placements for use with the generated floor map. In particular, in at least some embodiments, one or more types of constraints are applied relative to inter-room placement, and an optimal or otherwise preferred solution is determined for those constraints. FIG. 2C further illustrates examples of such constraints, including by matching 231 connecting passage information for adjacent rooms so that the locations of those passages are co-located in the final placement. Further possible constraints include optional use of room shape information, such as by matching 232 shapes of adjacent rooms in order to connect those shapes (e.g., as shown for rooms 229d and 229e), although in other embodiments such information may not be used. FIG. 2C also illustrates information 238 about one or more exact or approximate dimensions that may be available for use as constraints in placing of rooms and/or determining dimensions of particular rooms, such as based on additional metadata available regarding the building, analysis of images from one or more viewing locations external to the building (not shown), etc.—if dimensions are estimated, they may be generated to attempt to obtain a specified threshold level of accuracy, such as +/−0.1 meters, 0.5 meters, 1 meter, 5 meters, etc. Exterior connecting passages may further be identified and used as constraints 239, such as to prevent another room from being placed at a location that has been identified as a passage to the building's exterior.

Thus, in at least some embodiments, the generation of a final placement of multiple rooms for a floor map is performed as a constraint optimization problem, such as to first compute an initial preferred placement of each viewing location together with a surrounding estimated room shape in common global coordinates, and to then use the initial placements as initial conditions to solve a non-linear optimization algorithm to fine tune the placement and boundaries.

As one specific non-exclusive example of such generation of a floor map, and with respect to the initial preferred placement, the constraint can be formulated in mathematical form as follows, using the term "camera center" to refer to a center of a viewing location (since viewing locations may have non-zero sizes). For any camera center $C_i$, find the transformation matrix $T_i$ that projects the coordinates of the camera center to the global coordinate such that the pairwise camera angle relations is preserved as much as possible. For any camera center $C_j$ for which its pairwise angle $\theta$ to $C_i$ is known, calculate the distance $d_{(i,j)}$ of that point from the line that passes through $C_i$ with angle of $\theta$. The error of the initial preferred placements is measured as the sum of all possible distances $d_{(i,j)}$. Therefore, given a set of pairwise panorama image relations (i,j), the placement problem is defined as finding the set of transformation matrixes $T_i$s such that $d$ constraint is bounded $d<\epsilon$. Given the above framework, a valid placement should satisfy these constraints as much as possible.

The goal is to place the estimated room shapes (polygons or 3D shapes) into a global map such that the constraints on the initial placement is matched and satisfies the topological constraints. The main topological constraints that the room-shape matching should satisfy is to match the connecting passages between rooms, with the initial placements constraining the relative scale and alignment of the room shapes, with the room-shape matching algorithm thus less sensitive to small geometric and topological errors. Mathematically, the problem of room-shape matching can be defined as following, in which the $i$-th room shape ($S\_i$) is represented with a tuple of polygon points, camera center(s), and connecting passage edges: $S\_i=(X\_i, C\_i, e\_i)$ and $i$ is one of possible $n$ rooms. If a room has more than one panorama/viewing location, the $C\_i$ would represent a set of centers. The polygon points and camera centers are defined as a set of 2D points in homogenous coordinates and the edges are pairs of polygon node indices. The initial placement problem is then defined as finding affine transformation $T\_i$ for all the rooms $i\in\{1, 2, \ldots, n\}$ such that it satisfies the initial placement constraints (panorama-to-panorama constraints $C\_i<->C\_j$) as well as the connecting passage entry/exit point matchings $e\_i<->e\_j$.

$$\text{minimize}(\epsilon + \gamma)$$
$$s.t.\begin{cases} \|T_i X_{e_i} - T_j X_{e_j}\| < \gamma \ \forall \ (e_i, e_j) \\ d(C_i, L(i,j)) < \epsilon \ \forall \ (i,j) \\ 0 \le \epsilon < \epsilon_0 \\ 0 \le \epsilon < \gamma_0 \end{cases}$$

where $L(i,j)$ is the line that passes through $C\_i$ with the known pairwise angle between $C\_i$ and $C\_j$. $d(.,.)$ is the distance of the point from the line. $T\_i$ is the similarity transformation (Rotation, Scale, Translation) that maps the $i$-th room-shape coordinates to its final location, including to address warping such as shear and other shape deformations in the initial estimates. The above equations can be solved with a linear solver and the following conditions:

for every room-shape, at least one connecting passage entry/exit region that matches to another room-shape connecting passage entry/exit region is available;

camera centers are registered against a common global angle (e.g., global north);

for proper camera center placement, prefer at least 2 pair-wise correspondences for each camera center; and room shape estimator should provide the camera center location inside the room-shape polygon.

The global non-linear optimization is defined as an optimization to minimize cost $C\_g$ which incorporates the cost of overlapping room shapes, the topological cost which maintains that entry/exit regions are matched properly, and the consistency cost which maintains that the rooms are mostly made of straight lines and the other boundary of the floor map is usually a smooth shape. Mathematically the cost function is defined as:

$C\_g=C\_\text{overlap}+C\_\text{topology}+C\_\text{consistency}$, where,

C_overlap is the percentage of the overlap between areas of the room shape polygons.

C_topology is to the distance between matched entry/exit regions

C_consistency is the metric that measures the straightness of the boundary contour and the wall representing the room shapes.

In addition, in at least some embodiments, further pruning and optimization is performed to convert the matched room-shape nodes, lines, and polygons into a final output, such as to prune, merge, and unify the polygons and represent the wall widths and unknown/unobserved regions in the house.

In addition, textual labels have been added in the example of FIG. 2C for each of the rooms 229a-229f, such as based on an automated analysis of the information to identify estimated room types as discussed above (e.g., by using machine learning to match room features to types of room), or instead from other sources (e.g., textual labels associated with the panorama images during their acquisition and generation process, information manually supplied by a user, etc.). In this example, the lack of detailed information for room 229g prevents an automated determination of an estimated room type for that room.

Figure 2D:
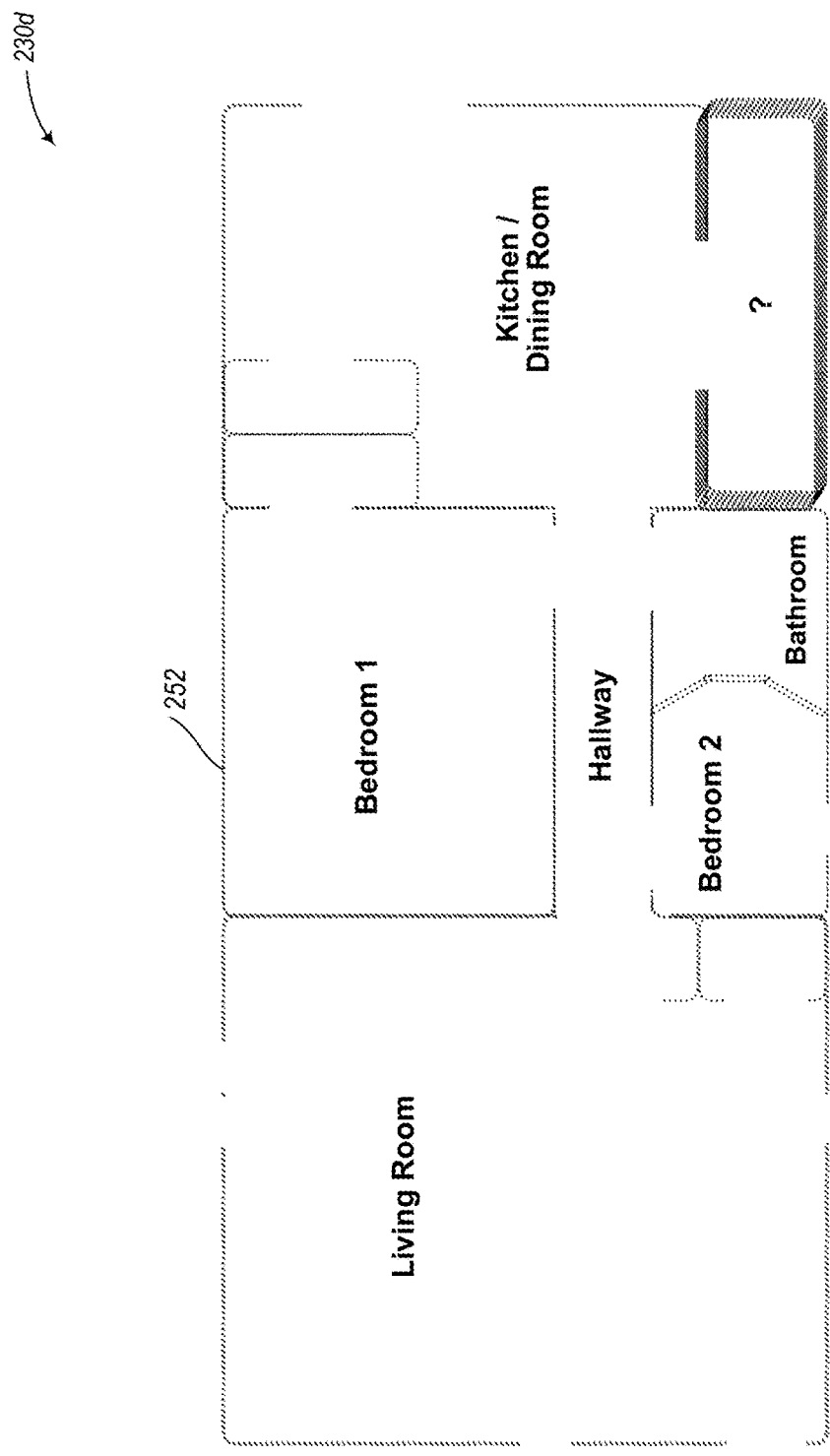

FIG. 2D continues the examples of FIGS. 2A through 2C, and includes information 230d that provides a final generated floor map 252 of the building. In particular, as discussed with respect to FIG. 2C and elsewhere, constraints have been applied to co-locate the various rooms relative to each other, including based at least in part on connecting passages between rooms, and using information about relative global positions of the viewing locations within the rooms. In this example, an estimated position of room 229g is included based in part on the connecting passage to room 229f, and optionally based on a modifiable presumption that the room extends to meet the east-most wall of bathroom 229e. While not illustrated in FIG. 2D, it will be appreciated that additional information may be determined for and associated with a floor map in other embodiments, including one or more of the following: estimated dimensions for individual rooms and/or the building as a whole; height information for some or all rooms, such as to generate a 3D rendering of the building; multiple interconnected sub-maps for the overall building floor map, such as to correspond to multiple stories or otherwise multiple levels in the building, and such as may be connected via stairs or other connecting passages (e.g., an elevator, escalator, etc.); etc.

Various details have been provided with respect to FIGS. 2A-2D, but it will be appreciated that the provided details are non-exclusive examples included for illustrative purposes, and other embodiments may be performed in other manners without some or all such details.

Figure 3:
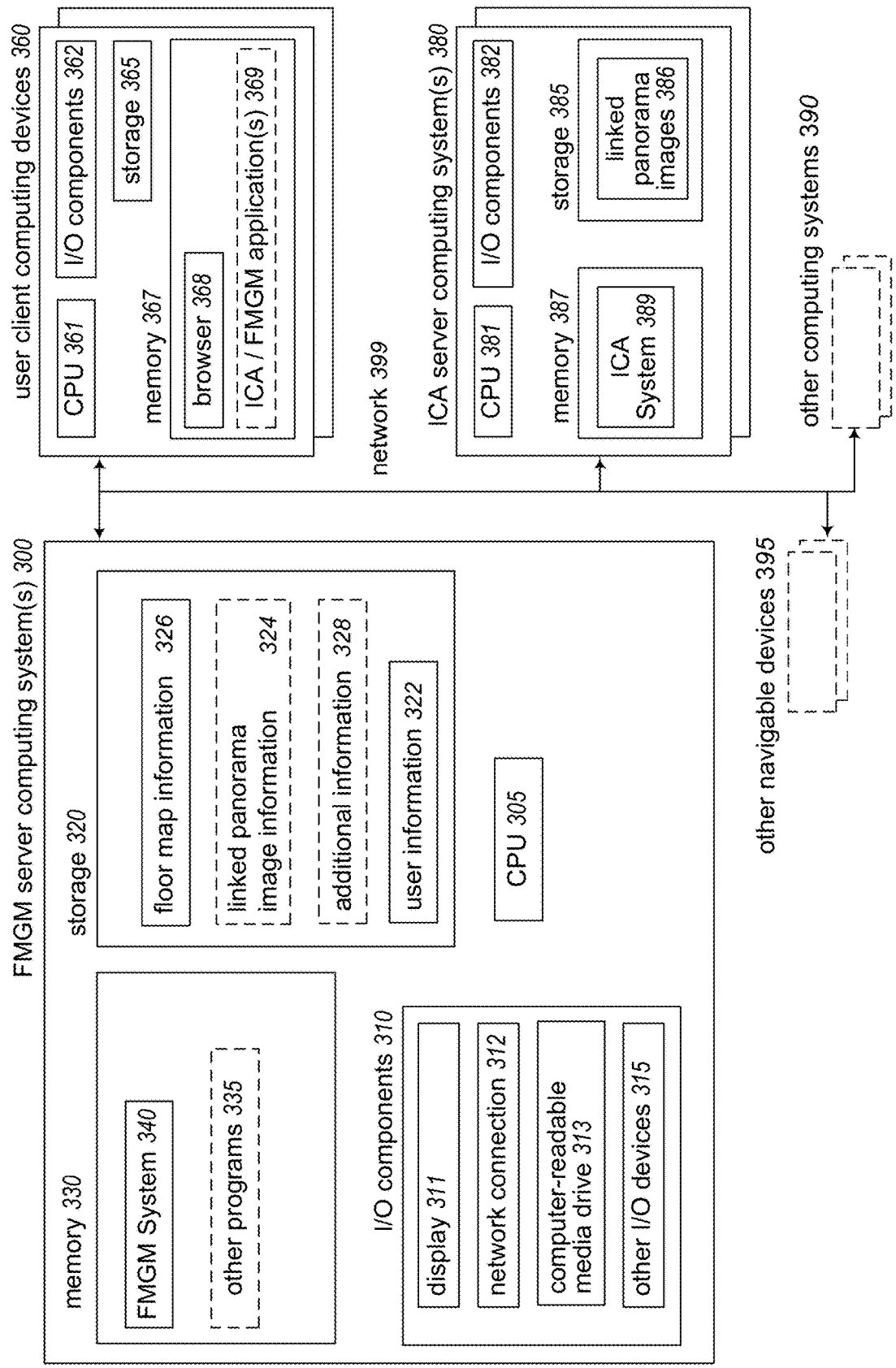
FIG. 3 is a block diagram illustrating a computing system suitable for executing an embodiment of a system that performs at least some of the techniques described in the present disclosure.

FIG. 3 is a block diagram illustrating an embodiment of one or more server computing systems 300 executing an implementation of a FMGM system 340—the server computing system(s) and FMGM system may be implemented using a plurality of hardware components that form electronic circuits suitable for and configured to, when in combined operation, perform at least some of the techniques described herein. In the illustrated embodiment, each server computing system 300 includes one or more hardware central processing units ("CPU") or other hardware processors 305, various input/output ("I/O") components 310, storage 320, and memory 330, with the illustrated I/O components including a display 311, a network connection 312, a computer-readable media drive 313, and other I/O devices 315 (e.g., keyboards, mice or other pointing devices, microphones, speakers, GPS receivers, etc.).

The server computing system(s) 300 and executing FMGM system 340 may communicate with other computing systems and devices via one or more networks 399 (e.g., the Internet, one or more cellular telephone networks, etc.), such as user client computing devices 360 (e.g., used to view floor maps, and optionally linked panorama images and/or other related information), ICA server computing system(s) 380 (e.g., on which an ICA system executes to generate and provide linked panorama images 386), optionally other computing systems 390 (e.g., used to store and provide additional information related to buildings; used to capture building interior data; used to store and provide information to client computing devices, such as linked panorama images instead of server computing systems 380 or 300 or instead additional supplemental information associated with those panoramas and their encompassing buildings or other surrounding environment; etc.), and optionally other navigable devices 395 that receive and use floor maps and optionally other generated information for navigation purposes (e.g., for use by semi-autonomous or fully autonomous vehicles or other devices).

In the illustrated embodiment, an embodiment of the FMGM system 340 executes in memory 330 in order to perform at least some of the described techniques, such as by using the processor(s) 305 to execute software instructions of the system 340 in a manner that configures the processor(s) 305 and computing system 300 to perform automated operations that implement those described techniques. The illustrated embodiment of the FMGM system may include one or more components, not shown, to each perform portions of the functionality of the FMGM system, and the memory may further optionally execute one or more other programs 335—as one specific example, a copy of the ICA system may execute as one of the other programs 335 in at least some embodiments, such as instead of or in addition to the ICA system 389 on the ICA server computing system(s) 380. The FMGM system 340 may further, during its operation, store and/or retrieve various types of data on storage 320 (e.g., in one or more databases or other data structures), such as various types of user information 322, optionally linked panorama image information 324 (e.g., for analysis to generate floor maps; to provide to users of client computing devices 360 for display; etc.), generated floor maps and optionally other associated information 326 (e.g., generated and saved 3D models, building and room dimensions for use with associated floor plans, additional images and/or annotation information, etc.) and/or various types of optional additional information 328 (e.g., various analytical information related to presentation or other use of one or more building interiors or other environments captured by an ICA system).

Some or all of the user client computing devices 360 (e.g., mobile devices), client computing systems 380, other navigable devices 395 and other computing systems 390 may similarly include some or all of the same types of components illustrated for server computing system 300. As one non-limiting example, the server computing systems 380 are each shown to include one or more hardware CPU(s) 381, I/O components 382, storage 385, and memory 387, with an embodiment of the ICA system 389 executing within memory 387, and with linked panorama images 386 that are generated by the ICA system being stored on storage 385. As another non-limiting example, the user client computing devices 360 are each shown to include one or more hardware CPU(s) 361, I/O components 362, storage 365, and memory 367, with one or both of a browser 368 and one or more client applications 369 (e.g., an application specific to the FMGM system and/or ICA system) executing within memory 367, such as to participate in communication with the FMGM system 340, ICA system 389 and/or other computing systems. While particular components are not illustrated for the other navigable devices 395 or other computing systems 390, it will be appreciated that they may include similar and/or additional components.

It will also be appreciated that computing system 300 and the other systems and devices included within FIG. 3 are merely illustrative and are not intended to limit the scope of the present invention. The systems and/or devices may instead each include multiple interacting computing systems or devices, and may be connected to other devices that are not specifically illustrated, including via Bluetooth communication or other direct communication, through one or more networks such as the Internet, via the Web, or via one or more private networks (e.g., mobile communication networks, etc.). More generally, a device or other computing system may comprise any combination of hardware that may interact and perform the described types of functionality, optionally when programmed or otherwise configured with particular software instructions and/or data structures, including without limitation desktop or other computers (e.g., tablets, slates, etc.), database servers, network storage devices and other network devices, smart phones and other cell phones, consumer electronics, wearable devices, digital music player devices, handheld gaming devices, PDAs, wireless phones, Internet appliances, and various other consumer products that include appropriate communication capabilities. In addition, the functionality provided by the illustrated FMGM system 340 may in some embodiments be distributed in various components, some of the described functionality of the FMGM system 340 may not be provided, and/or other additional functionality may be provided.

It will also be appreciated that, while various items are illustrated as being stored in memory or on storage while being used, these items or portions of them may be transferred between memory and other storage devices for purposes of memory management and data integrity. Alternatively, in other embodiments some or all of the software components and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the FMGM system 340 and/or FMGM client software 369 executing on server computing systems 300 and/or client computing devices 360) and/or data structures, such as by execution of software instructions of the one or more software programs and/or by storage of such software instructions and/or data structures, and such as to perform algorithms as described in the flow charts and other disclosure herein. Furthermore, in some embodiments, some or all of the systems and/or components may be implemented or provided in other manners, such as by consisting of one or more means that are implemented partially or fully in firmware and/or hardware (e.g., rather than as a means implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the components, systems and data structures may also be stored (e.g., as software instructions or structured data) on a non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, components and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

Figure 4A:
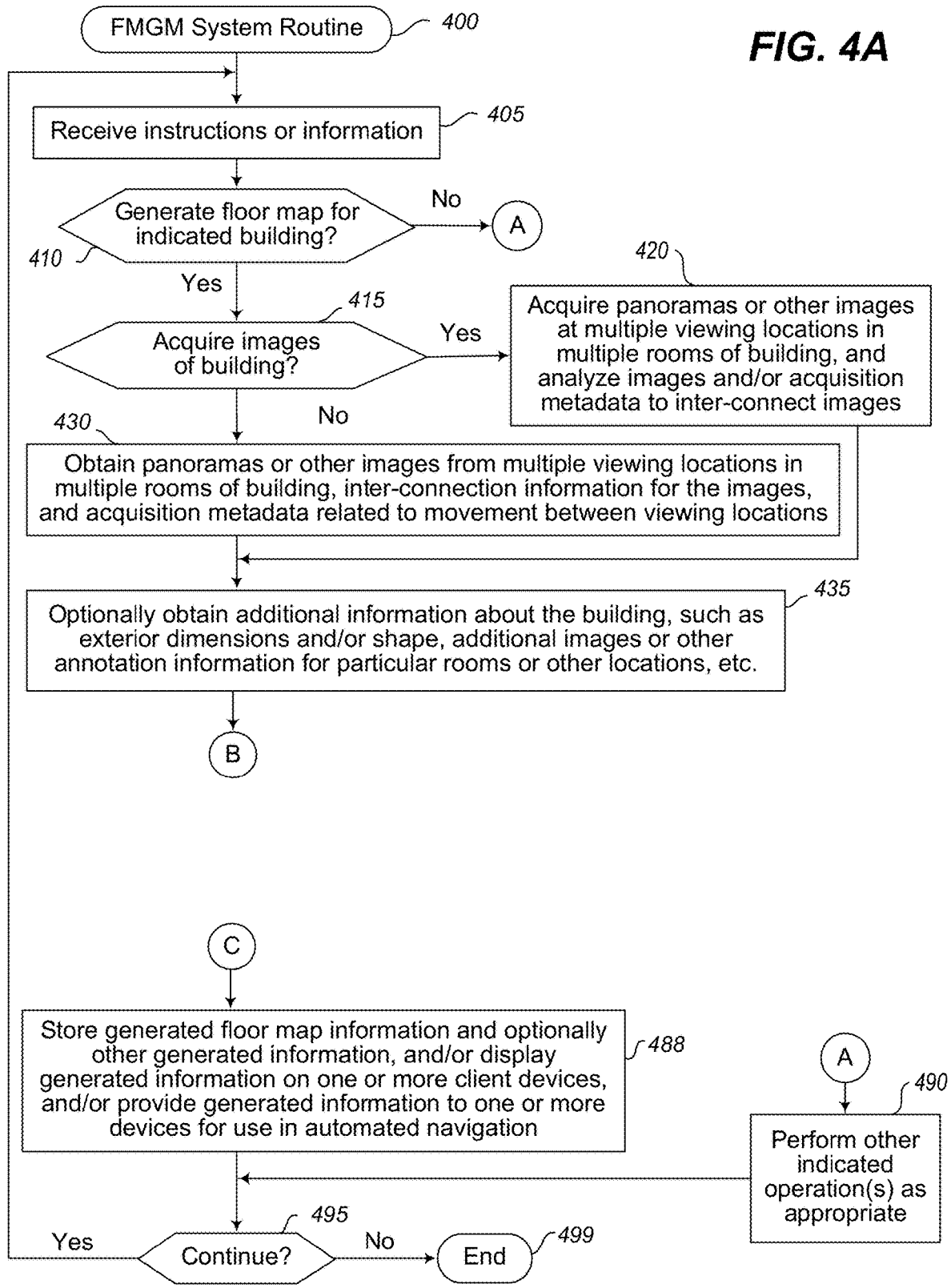
FIGS. 4A-4B illustrate an example embodiment of a flow diagram for a Floor Map Generation Manager (FMGM) system routine in accordance with an embodiment of the present disclosure.
Figure 4B:
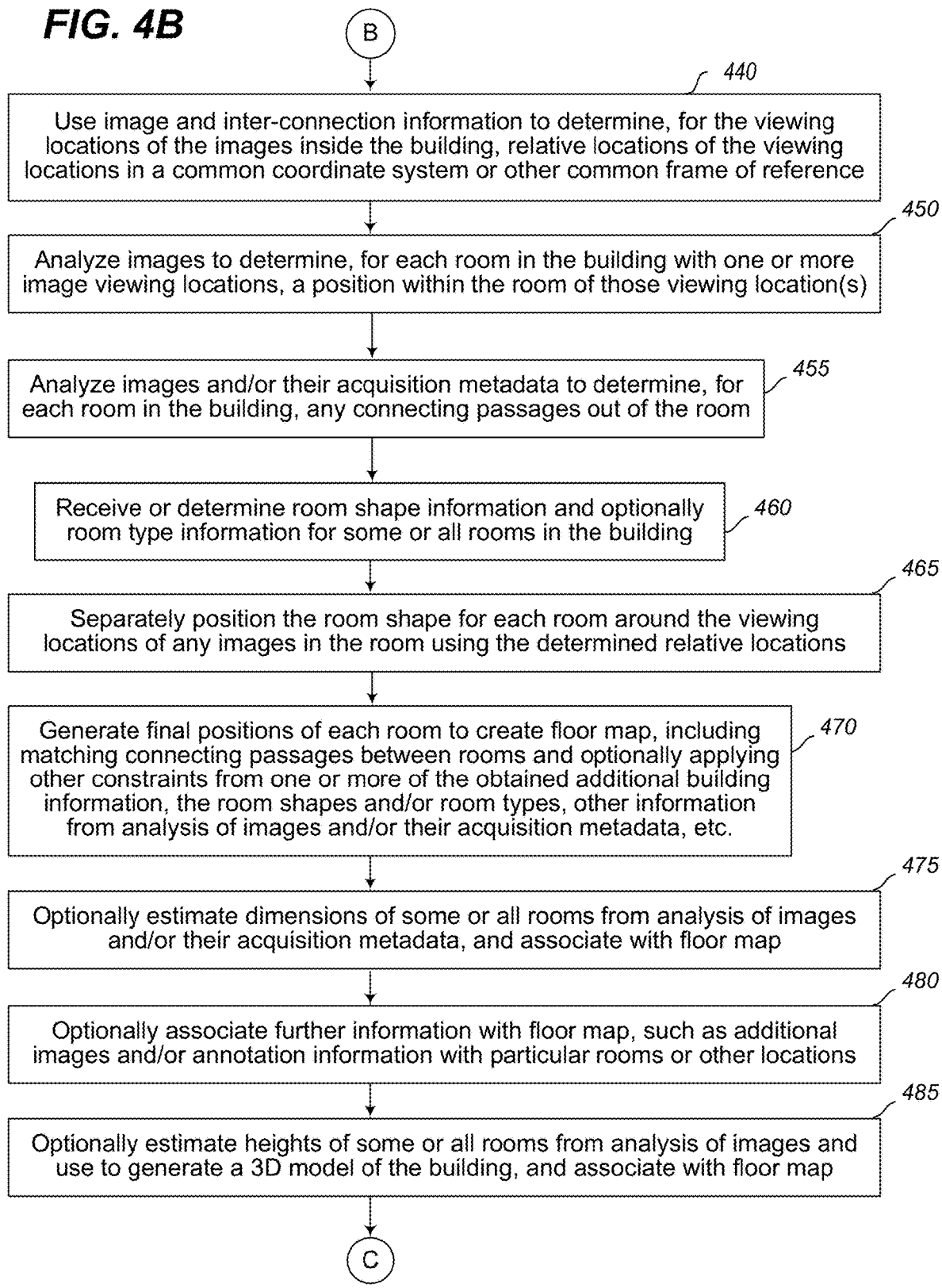

FIGS. 4A-4B illustrate an example embodiment of a flow diagram for a Floor Map Generation Manager (FMGM) System routine 400. The routine may be performed by, for example, execution of the FMGM system 140 of FIG. 1A, the FMGM system 340 of FIG. 3, and/or an FMGM system as discussed with respect to FIGS. 2A-2D and elsewhere as described herein, such as to generate and use mapping information for a defined area based at least in part on interconnected images of the area. In the example of FIGS. 4A-4B, the generated mapping information includes a floor map of a building, such as a house, but in other embodiments, other types of mapping information may be determined and generated for other types of buildings and used in other manners, as discussed elsewhere herein.

The illustrated embodiment of the routine begins at block 405, where information or instructions are received. The routine continues to block 410 to determine whether the instructions received in block 405 indicate to generate a floor map for an indicated building, optionally along with associated information about the building, and if so the routine continues to perform blocks 415-488 to do so, and otherwise continues to block 490.

In block 415, the routine determines whether inter-connected image information is already available for the building, or if such information instead needs to be acquired. If it is determined in block 415 that the information needs to be acquired, the routine continues to block 420 to acquire such information, optionally waiting for one or more users or devices to move throughout the building and acquire panoramas or other images at multiple viewing locations in multiple rooms of the building, and to further analyze the images and/or metadata information about their acquisition to interconnect the images, as discussed in greater detail elsewhere herein. If it is instead determined in block 415 that it is not necessary to acquire the images, the routine continues instead to block 430 to obtain existing panoramas or other images from multiple viewing locations in multiple rooms of the building, along with interconnection information for the images and acquisition of metadata information related to movement between the viewing locations, such as may optionally be supplied in block 405 along with the corresponding instructions.

After blocks 420 or 430, the routine continues to block 435 to optionally obtain additional information about the building, such as from one or more external sources (e.g., online databases, information provided by one or more users, etc.)—such additional information may include, for example, exterior dimensions and/or shape of the building, additional images and/or annotation information acquired corresponding to particular locations within the building (optionally for locations different from viewing locations of the acquired panorama or other images), etc.

After block 435, the routine continues to block 440 to use the obtained or acquired image and inner-connection information to determine, for the viewing locations of images inside the building, relative global positions of the viewing locations in a common coordinate system or other common frame of reference, such as to determine directions and optionally distances between the respective viewing locations. After block 440, the routine in block 450 analyzes the acquired or obtained panoramas or other images to determine, for each room in the building that has one or more viewing locations, a position within the room of those viewing locations, as discussed in greater detail elsewhere herein. In block 455, the routine further analyzes the images and/or the acquisition metadata for them to determine, for each room in the building, any connecting passages in or out of the room, as discussed in greater detail elsewhere herein. In block 460, the routine then receives or determines estimated room shape information and optionally room type information for some or all rooms in the building, such as based on analysis of images, information supplied by one or more users, etc., as discussed in greater detail elsewhere herein. It will be appreciated that, while blocks 450-460, are illustrated in separate operations, in some embodiments a single analysis of the images may be performed to acquire or determine multiple types of information, such as those discussed with respect to blocks 450-460.

In block 465, the routine then separately positions each room shape for each room around the viewing locations of any images in the room using the previously determined relative global position information for the viewing locations, in order to determine initial estimated positions of the room shapes, as discussed in greater detail elsewhere herein. In block 470, the routine then generates final positions of each room to create a resulting floor map, including matching connecting passages between rooms and optionally applying other constraints from one or more of the obtained additional building information, room shapes and/or room types, other information from the analysis of the images and/or their acquisition metadata, etc., as discussed in greater detail elsewhere herein. Such a floor map may include, for example, relative position and shape information for the various rooms without providing any actual dimension information for the individual rooms or building as a whole, and may further include multiple linked or associated sub-maps (e.g., to reflect different stories, levels, sections, etc.) of the building.

After block 470, the routine optionally performs one or more steps 475 through 485 to determine and associate additional information with the floor map. In block 475, the routine optionally estimates the dimensions of some or all of the rooms, such as from analysis of images and/or their acquisition metadata or from overall dimension information obtained for the exterior of the building, and associates the estimated dimensions with the floor map, as discussed in greater detail elsewhere herein—it will be appreciated that if sufficiently detailed dimension information were available, a floor plan may be generated from the floor map. After block 475, the routine continues to block 480 to optionally associate further information with the floor map, such as additional images and/or annotation information, and with particular rooms or other locations within the building, as discussed in greater detail elsewhere herein. In block 485, the routine further optionally estimates heights of some or all rooms, such as from analysis of images and optionally sizes of known objects in the images, as well as height information about a camera when the images were acquired, and further uses such information to generate a 3D model of the building, as discussed in greater detail elsewhere herein, with the 3D model further associated with the floor map.

After block 485, the routine continues to block 488 to store and/or otherwise use the generated floor map information and optionally other generated information, such as to provide the generated information for display on one or more client devices, provide that generated information to one or more other devices for use in automating navigation of those devices and/or associated vehicles or other entities, etc.

If it is instead determined in block 410 that the information or instructions received in block 405 are not to generate a floor map for an indicated building, the routine continues instead to block 490 to perform one or more other indicated operations as appropriate. Such other operations may include, for example, receiving and responding to requests for previously generated floor maps and/or other generated information (e.g., requests for such information for display on one or more client devices and/or to provide to one or more other devices for use in automated navigation), obtaining and storing information about buildings for use in later floor map generation operations (e.g., information about exterior images, dimensions, numbers or types of rooms, total square footage, etc.), etc.

After blocks 488 or 490, the routine continues to block 495 to determine whether to continue, such as until an explicit indication to terminate is received. If it is determined to continue, the routine returns to block 405 to wait for and receive additional instructions or information, and otherwise continues to block 499 and ends.

Aspects of the present disclosure are described herein with reference to flowchart illustrations and/or block diagrams of methods, apparatus (systems), and computer program products according to embodiments of the present disclosure. It will be appreciated that each block of the flowchart illustrations and/or block diagrams, and combinations of blocks in the flowchart illustrations and/or block diagrams, can be implemented by computer readable program instructions. It will be further appreciated that in some implementations the functionality provided by the routines discussed above may be provided in alternative ways, such as being split among more routines or consolidated into fewer routines. Similarly, in some implementations illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, or synchronous or asynchronous) and/or in a particular order, in other implementations the operations may be performed in other orders and in other manners. Any data structures discussed above may also be structured in different manners, such as by having a single data structure split into multiple data structures and/or by having multiple data structures consolidated into a single data structure. Similarly, in some implementations illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by corresponding claims and the elements recited by those claims. In addition, while certain aspects of the invention may be presented in certain claim forms at certain times, the inventors contemplate the various aspects of the invention in any available claim form. For example, while only some aspects of the invention may be recited as being embodied in a computer-readable medium at particular times, other aspects may likewise be so embodied.

What is claimed is:

1. A computer-implemented method comprising:
obtaining, by a computing device, and for a building with multiple rooms, information about a plurality of panorama images taken at a plurality of viewing locations within the multiple rooms, and about relative positional information for the plurality of viewing locations that includes directional information between at least some pairs of the plurality of viewing locations, wherein the plurality of panorama images includes at least one panorama image in each room that captures at least some of an interior of that room;
using, by the computing device, and without using acquired depth information about depth from the plurality of viewing locations to walls of the multiple rooms, the obtained information to automatically generate a floor map of the building that has estimated room shapes of the multiple rooms positioned relative to each other, including:
analyzing, by the computing device, the directional information between the at least some pairs of the plurality of viewing locations to generate an estimated location of each of the plurality of viewing locations in a common coordinate system;
determining, by the computing device for each of the plurality of panorama images, an estimated position of the viewing location of the panorama image within that room;
placing, by the computing device, and for each of the multiple rooms, an estimated room shape of the room in the common coordinate system around the generated estimated location for the at least one panorama image in the room, including using the determined estimated position of the viewing location of the at least one panorama image in that room for the placing; and
arranging, by the computing device, and to produce the generated floor map of the building, the placed estimated room shapes of the multiple rooms relative to each other to reach a final placement, including applying constraints on room shape location to match connecting passages between rooms; and
displaying, by the computing device, the generated floor map of the building on one or more client devices, to cause use of the displayed generated floor map of the building for navigating the building.

2. The computer-implemented method of claim 1 further comprising using, by the computing device, the generated floor map to further control navigation activities by an autonomous vehicle, including providing the generated floor map for use by the autonomous vehicle in moving between the multiple rooms of the building.

3. The computer-implemented method of claim 1 wherein the displaying of the generated floor map further includes displaying user-selectable controls on the displayed floor map in positions of the plurality of viewing locations, and wherein the method further comprises:
receiving a selection of a user of one of the displayed user-selectable controls on the displayed floor map for one of the plurality of viewing locations; and
displaying, to the user and in response to the selection, at least a portion of one of the plurality of panorama images taken at the one viewing location.

4. The computer-implemented method of claim 1 wherein the using of the obtained information to automatically generate the floor map further includes automatically generating, by the computing device, a three-dimensional model of the building based at least in part on adding estimated height information for one or more of the multiple rooms to the generated floor map, wherein the displaying of the generated floor map further includes displaying a user-selectable control on the displayed floor map to represent the generated three-dimensional model, and wherein the method further comprises:

receiving a selection of a user of the displayed user-selectable control on the displayed floor map; and displaying, to the user and in response to the selection, at least a portion of the generated three-dimensional model.

5. The computer-implemented method of claim 4 wherein the automatic generating of the three-dimensional model of the building further includes determining, by the computing device and based at least in part on a determination of camera height for one or more of the plurality of viewing locations and on analysis of one or more of the plurality of panorama images to identify one or more objects of known size, the estimated height information for the one or more rooms.

6. The computer-implemented method of claim 1 further comprising:

receiving additional information about one or more additional images taken from one or more additional locations within the building;

displaying, for at least one of the one or more additional locations, a user-selectable control on the displayed floor map to represent the at least one additional location;

receiving a selection of a user of the displayed user-selectable control on the displayed floor map for one of the additional locations; and displaying, to the user and in response to the selection, at least one of the one or more additional images that is taken from the one additional location.

7. The computer-implemented method of claim 1 further comprising:

receiving additional information about one or more textual annotations associated with one or more locations within the building;

displaying, for at least one of the one or more locations, a user-selectable control on the displayed floor map to represent the at least one location;

receiving a selection of a user of the displayed user-selectable control on the displayed floor map for one of the locations; and displaying, to the user and in response to the selection, at least one of the one or more textual annotations that is associated with the one location.

8. The computer-implemented method of claim 1 wherein the building has multiple stories, wherein the using of the obtained information to automatically generate the floor map further includes automatically generating, by the computing device, a sub-map of the floor map for each of the multiple stories, and identifying connections between sub-maps based at least in part on connecting passages between the sub-maps, wherein the displaying of the generated floor map further includes displaying at least one of the sub-maps and a user-selectable control on the displayed at least one sub-map to represent a connecting passage to another sub-map, and wherein the method further comprises:

receiving a selection of a user of the displayed user-selectable control on the displayed floor map; and displaying, to the user and in response to the selection, at least a portion of the another sub-map that represents the connecting passage from the displayed at least one sub-map.

9. The computer-implemented method of claim 1 further comprising:

determining, by the computing device and based at least in part on analysis of one or more of the plurality of panorama images to identify one or more objects of known size, estimated dimensions for one or more rooms of the multiple rooms; and displaying, on the displayed floor map, the determined estimated dimensions in association with the one or more rooms.

10. The computer-implemented method of claim 1 further comprising:

determining, by the computing device and based at least in part on analysis of linking information from a travel path between two or more viewing locations during acquisition of panorama images from the two or more viewing locations, estimated dimensions for one or more rooms of the multiple rooms; and displaying, on the displayed floor map, the determined estimated dimensions in association with the one or more rooms.

11. The computer-implemented method of claim 1 wherein the applying of the constraints on the room shape location during the arranging further includes using at least one of a group of constraints including one or more constraints based on the estimated room shape for two or more adjacent rooms, or one or more constraints based on overall dimension information for the building, or one or more constraints based on an exterior shape of the building, and includes minimizing an aggregate error for the constraints that are used.

12. The computer-implemented method of claim 11 wherein the applying of the constraints further includes using the one or more constraints based on the estimated room shape for two or more adjacent rooms and the one or more constraints based on the overall dimension information for the building and the one or more constraints based on the exterior shape of the building, and wherein the method further comprises obtaining one or more additional images taken from one or more additional viewing locations external to the building, and analyzing the one or more additional images to determine at least one of the overall dimension information for the building or the exterior shape of the building.

13. The computer-implemented method of claim 1 wherein the analyzing of the relative positional information for the plurality of viewing locations to generate the estimated locations of the plurality of viewing locations in the common coordinate system further includes minimizing aggregate error of positions of the plurality of viewing locations from the directional information between the some pairs of viewing locations.

14. The computer-implemented method of claim 1 wherein the determining of the estimated position of the viewing location of each panorama image within one of the multiple rooms further includes analyzing the panorama image to identify multiple features within the one room, and selecting the estimated position of the viewing location based at least in part on determined directions from the viewing location to the identified multiple features.

15. The computer-implemented method of claim 14 wherein the analyzing of each of the panorama images further includes determining, by the computing device and for each of the multiple rooms, one or more connecting passages from the room to at least one other room by identifying one or more features corresponding to each connecting passage from the at least one panorama image in the room.

16. The computer-implemented method of claim 14 wherein the analyzing of each of the panorama images further includes determining, by the computing device and for each of the multiple rooms, the estimated room shape of the room.

17. The computer-implemented method of claim 14 wherein the analyzing of each of the panorama images further includes determining, by the computing device and for each of the multiple rooms, an estimated type of the room, and wherein the method further comprises annotating the generated floor map to show the estimated type of room for each of the multiple rooms.

18. The computer-implemented method of claim 1 further comprising obtaining additional information about the plurality of panorama images that includes sensor data gathered for a travel path taken between viewing locations during acquisition of the plurality of panorama images, analyzing, by the computing node, the travel path to identify locations where the travel path moves between rooms, and using the identified locations as connecting passages between the rooms during the applying of the constraints.

19. The computer-implemented method of claim 1 wherein the building further includes one or more additional areas that are separate from the multiple rooms and that do not include any of the viewing locations, and wherein the using of the obtained information to automatically generate the floor map further includes representing the one or more additional areas on the generated floor map as unknown areas.

20. A non-transitory computer-readable medium having stored contents that cause a computing device to perform automated operations including at least:
   obtaining, by the computing device, and for a building with multiple rooms, information about a plurality of panorama images taken at a plurality of viewing locations within the multiple rooms, and about relative positional information for the plurality of viewing locations that includes directional information between at least some pairs of the plurality of viewing locations, wherein the plurality of panorama images includes at least one panorama image in each room that captures at least some of an interior of that room;
   using, by the computing device, and without using acquired depth information that measures depth from the plurality of viewing locations to walls of the multiple rooms, the obtained information to automatically generate a floor map of the building that has estimated room shapes of the multiple rooms positioned relative to each other, including:
      analyzing, by the computing device, the relative positional information for the plurality of viewing locations to generate an estimated location of each of the plurality of viewing locations in a common coordinate system;
      determining, by the computing device for each of the plurality of panorama images, an estimated position of the viewing location of the panorama image within that room;
      placing, by the computing device, and for each of the multiple rooms, an estimated room shape of the room in the common coordinate system around the generated estimated location of the viewing location for the at least one panorama image in the room, including using the determined estimated position of the viewing location of the at least one panorama image in that room for the placing; and
   arranging, by the computing device, and to produce the generated floor map of the building, the placed estimated room shapes of the multiple rooms relative to each other to reach a final placement, including applying constraints on room shape location to match connecting passages between rooms; and
   displaying, by the computing device, the generated floor map of the building on one or more client devices, to enable use of the displayed generated floor map of the building.

21. The non-transitory computer-readable medium of claim 20 wherein the displaying of the generated floor map further includes displaying user-selectable controls on the displayed floor map in positions of the plurality of viewing locations, and wherein the stored contents include software instructions that, when executed, cause the computing device to perform further automated operations that include at least:
   receiving a selection by a user of one of the displayed user-selectable controls on the displayed floor map for one of the plurality of viewing locations; and
   displaying, to the user and in response to the selection, at least a portion of one of the plurality of panorama images taken at the one viewing location.

22. The non-transitory computer-readable medium of claim 20 wherein the stored contents include software instructions that, when executed, cause the computing device to perform further automated operations that include at least:
   determining, by the computing device and based at least in part on analysis of linking information acquired along a travel path between two or more viewing locations during acquisition of panorama images from the two or more viewing locations, estimated dimensions for one or more rooms of the multiple rooms;
   generating, by the computing device and using the determined estimated dimensions, a three-dimensional model of the building based at least in part on adding estimated height information for the one or more rooms to the generated floor map; and
   displaying, by the computing device, at least a portion of generated three-dimensional model.

23. A system comprising:
   one or more hardware processors of one or more computing devices; and
   one or more memories with stored instructions that, when executed by at least one of the one or more hardware processors, cause at least one of the one or more computing devices to perform automated operations including at least:
      obtaining, for a building with multiple rooms, information about a plurality of panorama images taken at a plurality of viewing locations within the multiple rooms, and about relative positional information for the plurality of viewing locations that includes directional information between pairs of the plurality of viewing locations, wherein the plurality of panorama images includes at least one panorama image in each room that captures at least some of an interior of that room;
      using the obtained information to automatically generate a floor map of the building that has estimated room shapes of the multiple rooms positioned relative to each other, without using acquired depth information from depth-sensing equipment about a depth from the viewing location for each of the plurality of panorama images to walls of a room in which that panorama image was captured, including:
analyzing the relative positional information for the plurality of viewing locations to generate an estimated location of each of the plurality of viewing locations in a common coordinate system;
determining, for each of the plurality of panorama images, an estimated position of the viewing location of the panorama image within that room;
placing, for each of the multiple rooms, an estimated room shape of the room in the common coordinate system around the generated estimated location of the viewing location for the at least one panorama image in the room, including using the determined estimated position of the viewing location of the at least one panorama image in that room for the placing; and
arranging, to produce the generated floor map of the building, the placed estimated room shapes of the multiple rooms relative to each other to reach a final placement, including applying constraints on room shape location to match connecting passages between rooms; and
displaying the generated floor map of the building on one or more client devices.

24. The system of claim 23 wherein the applying of the constraints on the room shape location during the arranging further includes using at least one of a group of constraints including one or more constraints based on the estimated room shape for two or more adjacent rooms, or one or more constraints based on overall dimension information for the building, or one or more constraints based on an exterior shape of the building, and includes minimizing an aggregate error for the constraints that are used.

25. The system of claim 24 wherein the applying of the constraints further includes using the one or more constraints based on the estimated room shape for two or more adjacent rooms and using the one or more constraints based on the overall dimension information for the building and using the one or more constraints based on the exterior shape of the building, and wherein the automated operations further include obtaining one or more additional images taken from one or more additional viewing locations external to the building, and analyzing the one or more additional images to determine at least one of the overall dimension information for the building or the exterior shape of the building.

* * * * *